(12) United States Patent
Shimamura et al.

(10) Patent No.: US 7,257,476 B2
(45) Date of Patent: Aug. 14, 2007

(54) SELECT LEVER DEVICE FOR AUTOMATIC TRANSMISSION

(75) Inventors: Yuzo Shimamura, Nakano-ku (JP); Nobuaki Tsuchiya, Nakano-ku (JP); Wataru Shimizu, Nakano-ku (JP); Toru Aoki, Nakano-ku (JP)

(73) Assignee: Calsonic Kansei Corporation, Tokyo (JP)

( * ) Notice: Subject to any disclaimer, the term of this patent is extended or adjusted under 35 U.S.C. 154(b) by 791 days.

(21) Appl. No.: 10/752,185

(22) Filed: Jan. 7, 2004

(65) Prior Publication Data

US 2004/0139815 A1    Jul. 22, 2004

(30) Foreign Application Priority Data

| Jan. 7, 2003 | (JP) | ............................. 2003-001509 |
| Feb. 28, 2003 | (JP) | ............................. 2003-054168 |
| Mar. 18, 2003 | (JP) | ............................. 2003-074198 |
| Mar. 18, 2003 | (JP) | ............................. 2003-074200 |

(51) Int. Cl.
   *G06F 17/00* (2006.01)

(52) U.S. Cl. .................... 701/51; 74/473.12; 74/473.1; 74/335

(58) Field of Classification Search .................. 701/51; 74/473.12, 473.1, 335

See application file for complete search history.

(56) References Cited

U.S. PATENT DOCUMENTS

| 6,209,408 | B1 * | 4/2001 | DeJonge et al. ............... 74/335 |
| 6,536,297 | B2 * | 3/2003 | Yamamoto .................... 74/335 |
| 6,904,823 | B2 * | 6/2005 | Levin et al. ........... 74/471 XY |
| 7,013,748 | B2 * | 3/2006 | Satoh et al. ............. 74/473.12 |

FOREIGN PATENT DOCUMENTS

| EP | 0872670 B1 | 10/1998 |
| EP | 1156237 A2 | 11/2001 |
| JP | 5-87237 | 4/1993 |

\* cited by examiner

*Primary Examiner*—Gary Chin
*Assistant Examiner*—Marie A Weiskopf
(74) *Attorney, Agent, or Firm*—Wenderoth, Lind & Ponack, L.L.P.

(57) ABSTRACT

A select lever device for an automatic transmission includes: a torque sensor to detect an input torque to a drive shaft of a select lever; a select position sensor to detect the stroke angle of the select lever; a characteristic data storing unit in which a mechanical load characteristic of the select lever is stored; and a control unit to which signals and data of these elements are inputted. Further, the control unit includes an electric motor to output to the select lever assist torque for assisting the operating force by a driver, the assist torque being controlled based on the input torque to the select lever, the stroke angle of the select lever, and the mechanical load characteristic of the select lever.

20 Claims, 26 Drawing Sheets

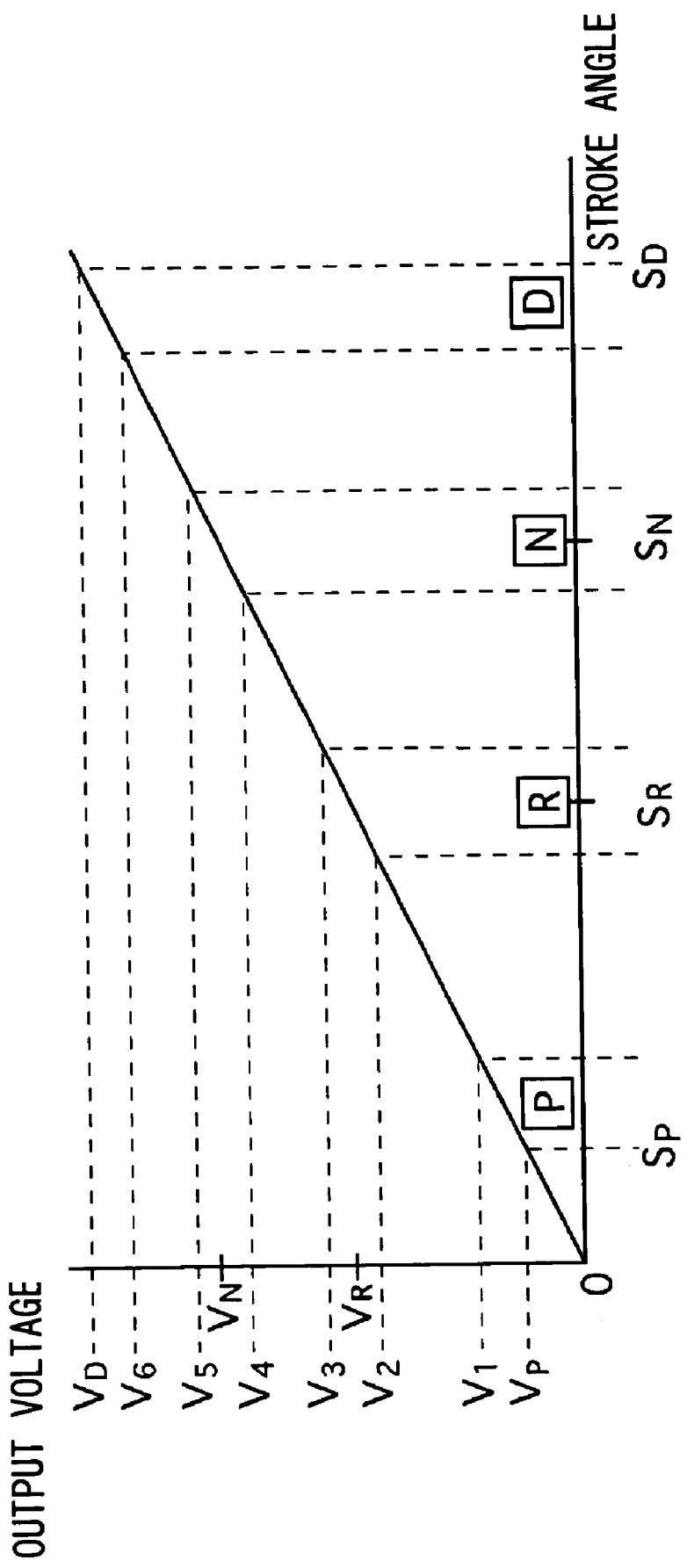

F I G. 5

| OUTPUT VOLTAGE | STROKE POSITION |
| --- | --- |
| $V_P$ | P POSITION UTMOST END |
| $V_D$ | D POSITION UTMOST END |
| $V_1$ | P → R START POINT (OR R → P STOP POINT) |
| $V_2$ | P → R STOP POINT (OR R → P START POINT) |
| $V_3$ | R → N START POINT (OR N → R STOP POINT) |
| $V_4$ | R → N STOP POINT (OR N → R START POINT) |
| $V_5$ | N → D START POINT (OR D → N STOP POINT) |
| $V_6$ | N → D STOP POINT (OR D → N START POINT) |
| $V_R$ | STOP POSITION MEDIAN IN R POSITION |
| $V_N$ | STOP POSITION MEDIAN IN N POSITION |

SELECT LEVER DEVICE FOR AUTOMATIC TRANSMISSION

BACKGROUND OF THE INVENTION

1. Field of the Invention

The present invention relates to a select lever device for an automatic transmission by which a driver can select one of select positions corresponding to a plurality of operating modes of the automatic transmission.

2. Description of the Related Art

This kind of select lever device for an automatic transmission is disclosed in Japanese Patent Laid-open No. Hei 9-323559. This select lever device is disposed near a driver's seat in a passenger compartment, and when a driver operates a select lever, the operating force of this select lever is transmitted to the automatic transmission via a connecting cable, a connecting linkage, or the like, so that the operating modes of the automatic transmission are changed over from one operating mode to another according to the select position (such as P position for parking, R position for reverse drive, N position for neutral, or D position for forward drive).

For the operation of the select lever, torque generated by the operating force has to be larger than torque caused by the sum of a frictional resistance in the connecting cable or connecting linkage, a resistance generated when a detent pin gets over a cam top portion in a detent mechanism for detaining the select lever in the desired position, and others. Therefore, the conventional select lever device has a select lever long enough to reduce the required operating force, and its lever force is utilized to convert the driver's operating force to a larger torque in operating the select lever.

The conventional art, however, has a problem that the select lever has to be long in order to produce a sufficient lever force, which necessitates a large space. This reduces the freedom degree of the layout in the passenger compartment and results in restriction on the installation place of the select lever device. Consequently, the installation place of the select lever device is limited to the side of the driver's seat or the vicinity of a steering column.

SUMMARY OF THE INVENTION

The present invention is made in view of the problems stated above, and an object thereof is to provide a select lever device for an automatic transmission that can become more compact but and reduce a required operating force of a select lever.

In order to achieve the object stated above, a select lever device for an automatic transmission of the invention includes: a select lever; a select position detector of the select position mode of the automatic transmission shifted by the select lever; an input torque detecting unit to detect an input torque to the select lever and output an input torque signal; an operating position detecting unit to detect an operating position of the select lever and output a signal of the operating position of the select lever; a characteristic data storing unit in which characteristic data obtained based on a mechanical load characteristic of the select lever is stored; an assist control unit to output an assist control signal that controls assist torque based on the input torque signal inputted from the input torque detecting unit, the operating position inputted from the operating position detecting unit, and the characteristic data read from the characteristic data storing unit; and an assist actuator to output to the select lever the assist torque for assisting the operating force inputted to the select lever, based on the assist control signal inputted from the assist control unit.

Therefore, according to the present invention, the select lever can be made shorter than that of the conventional art. Moreover, even when the select lever is short, the assist torque, which is determined based on the characteristic data and so on obtained based on the mechanical load characteristic of the select lever, is outputted from the assist actuator and acts on the select lever. This makes it possible to provide a select lever device for an automatic transmission being compact but capable of reducing the select lever operating force.

Preferably, the select lever device for the automatic transmission further includes: a set value storing unit in which operating position set data on the operating position of the select lever and a set value of the output signal that is set for each operating position is stored; a halt judging means to judge whether or not the select lever is in halt; a difference detecting means to compare, when the halt judging means judges that the select lever is in halt, an input value of the signal of the actual operating position of the select lever in a current select position, which is outputted from the operating position detecting unit, and the set value read from the set value storing unit based on the current select position detected by the select position detector, and detect a difference amount of the set value from the input value; and an operating position set data correcting means to correct the operating position set data stored in the set value storing unit, based on the input value when the detected difference amount is larger than a first threshold value.

In this invention, even if the increase in contact resistance of an operating position sensor, the displacement of a contact portion thereof, and so on occur due to the change over time, and thus the actual operating position signal (input value) outputted from the operating position sensor becomes different from the operating position signal (set value) set in the operating position set data corresponding to the current operating position, the operating position set data can be corrected. This can prevent insufficient assist and excessive assist which are caused because the assist control unit controls the assist actuator based on erroneous position information of the select lever. Accordingly, a locked feeling from over assist or insufficient assist, the occurrence of so-called overrun, which is a state of the select lever not stopping at a predetermined position, and so on can be prevented.

Preferably, the select lever device for the automatic transmission further includes an operating speed detecting means to detect an operating speed of the select lever, and when the operating speed of the select lever detected by the operating speed detecting means exceeds a preset speed, the assist control unit outputs one of the signals of an assist control signal that controls the assist torque in the selected select position to be smaller than the assist torque that is set when the operating speed of the select lever is at most the set speed; and an assist control signal that controls the output of the assist torque to be delayed until a preset period of time passes.

In this invention, the assist amount is reduced to produce an appropriate click feeling when the operating speed of the select lever is high. This can prevent the overrun of the select lever running over a desired position.

Preferably, the select lever device for the automatic transmission further includes an operating speed detecting means to detect an operating speed of the select lever, and the assist control unit judges that the select lever is abnormally operated when the operating speed of the select lever is lower than a preset speed, and controls the assist actuator to stop outputting the assist torque.

In feedback control over the assist torque to be given by the assist actuator based on the input torque to the select lever, when the operating speed of the select lever is extremely low, an output value of the assist torque greatly changes in a short time and a variation in the assist torque becomes unproportionally great relative to a shift amount of the select lever. This causes the select lever to vibrate and the vibration is transmitted to a driver. In this invention, a bad operating feeling due to the vibration of the select lever is prevented.

BRIEF DESCRIPTION OF THE DRAWINGS

The objects, features and advantages of the present invention will become apparent as the description proceeds when taken in conjunction with the accompanying drawings, in which:

FIG. 4 is a chart showing the relation between the output voltage of a position sensor and the stroke angle of a select lever;

FIG. 5 is a table showing the correspondence relationship between the output voltage of the position sensor and the stroke position of the select lever;

DETAILED DESCRIPTION OF THE PREFERRED EMBODIMENTS

Figure 1:
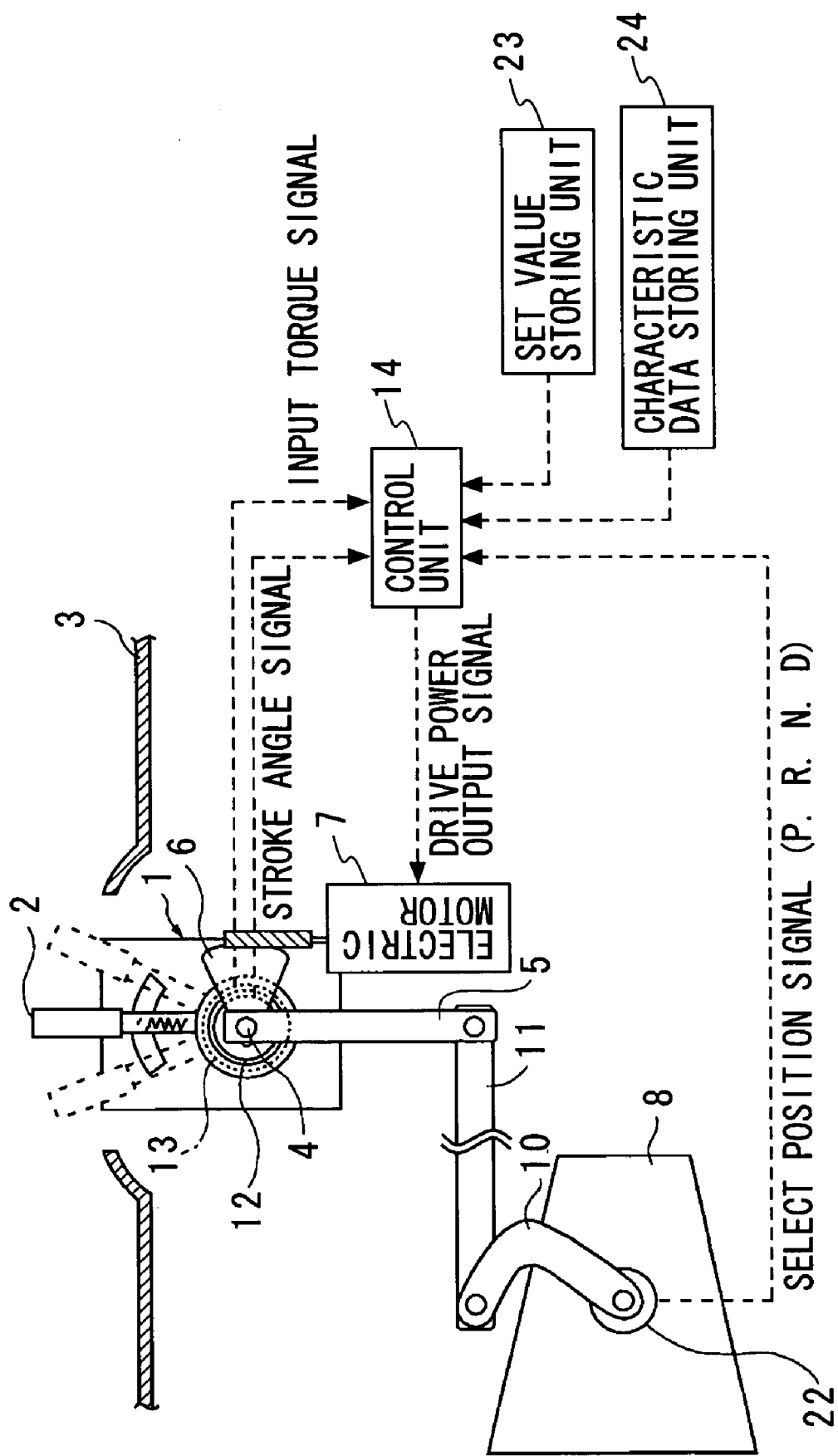
FIG. 1 is a side view showing the construction of an automatic transmission having a select lever device for an automatic transmission according to the present invention.

Hereinafter, a select lever device for an automatic transmission according to embodiments of the present invention will be described with reference to the drawings.

Throughout the following detailed description, similar reference characters and numbers refer to similar elements in all figures of the drawings, and their descriptions are omitted for eliminating duplication.

First, the construction of a select lever device for an automatic transmission according to a first embodiment of the present invention will be described. FIG. 1 is a side view showing the construction of an automatic transmission having a select lever device of the present invention, and FIG. 2 is a fragmentary sectional rear view of the select lever device for the automatic transmission.

Figure 2:
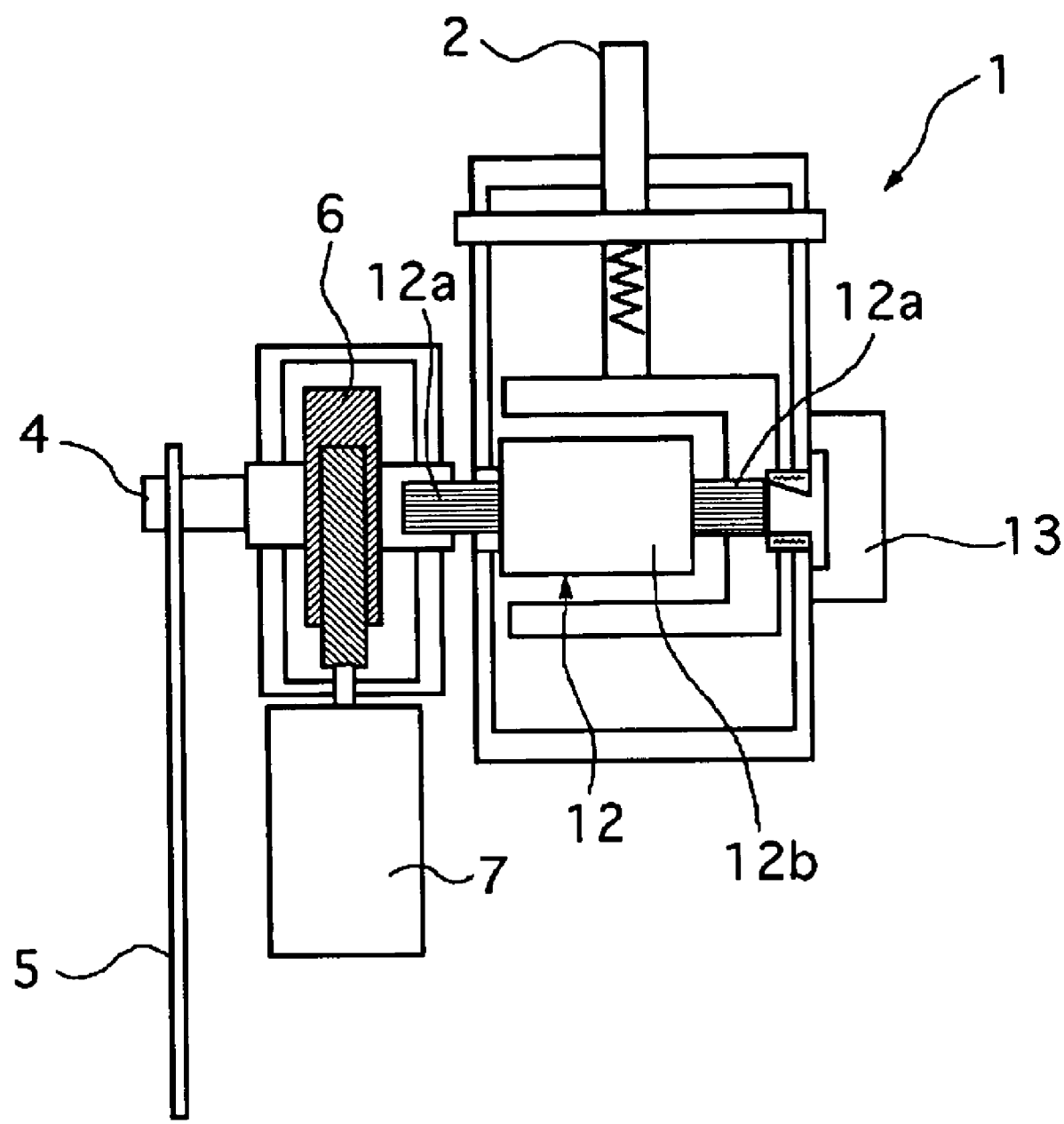
FIG. 2 is a fragmentary sectional rear view of the select lever device for the automatic transmission of the present invention in FIG. 1.

As shown in FIG. 1 and FIG. 2, a select lever device 1 is arranged, for example, at a center console 3 beside a driver's seat. The select lever device 1 has a select lever 2 operated by a driver and projecting above the surface of the center console 3. The select lever 2 is operated to rotate in a longitudinal direction of a vehicle at a drive shaft 4 disposed at a lower end of the select lever 2. The select lever 2, whose length is set to about 100 mm, is designed to be shorter than a conventional typical select lever by about 25 mm.

Therefore, a projecting amount of the select lever 2 into space in a passenger compartment is smaller than that of the conventional select lever, which makes the select lever device 1 more compact and reduces the movement range of the select lever 2 when it is operated. As a result, the freedom degree of the layout in the passenger compartment is enhanced to allow the installation of the select lever device 1 also at other position as required, for example, on an instrument panel or the like.

A drive lever 5 is fixed at its upper end to the drive shaft 4 of the select lever 2 to rotate as a unit. The drive shaft 4 is provided with a sector gear 6. The sector gear 6 is mated with a worm 6a connected to an output shaft of an electric motor 7 that is controlled by a control unit 14. The electric motor 7 rotates the worm 6a to drive the drive lever 5 trough the sector gear 6, assisting the operating force of the driver. Note that the electric motor 7 functions as an assist actuator of the present invention and that the control unit 14 corresponds to an assist control unit of the present invention.

Figure 3:
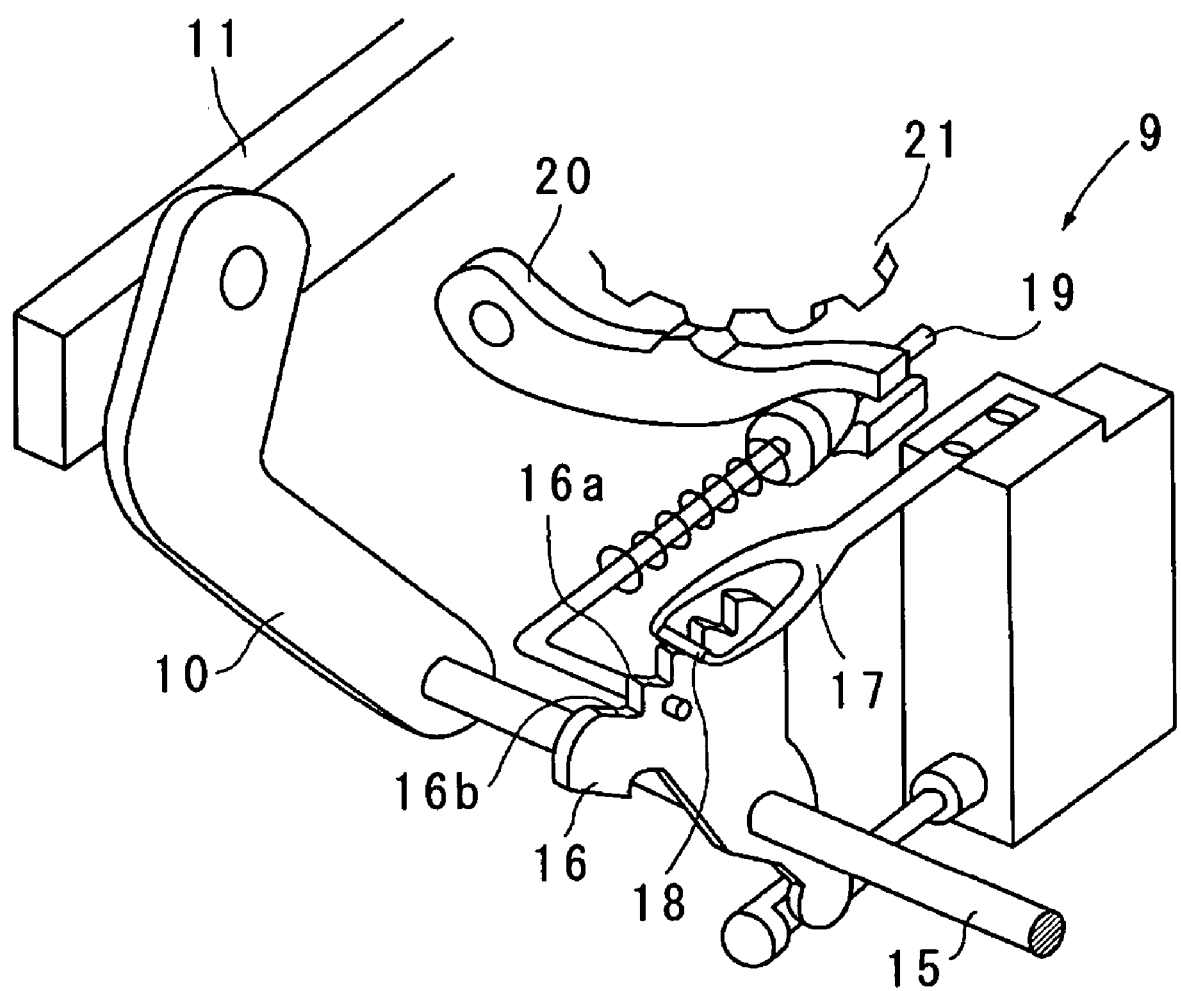
FIG. 3 is a perspective view showing the construction of a detent mechanism of the automatic transmission in FIG. 1.

A lower end of the drive lever 5 is coupled to one end portion of a rod-shaped connecting rod 11. As shown in FIG. 3, the other end portion of the connecting rod 11 is connected to a detent mechanism 9 via a driven arm 10. The detent mechanism 9 is attached to an automatic transmission 8 to maintain a manual valve spool and a parking rod at their desired positions.

The detail construction of the detent mechanism 9 will be described later. The automatic transmission 8 is also provided with an inhibitor switch 22 that detects a select position corresponding to each operating mode of the automatic transmission 8 to output a select position signal of the automatic transmission 8 and input the select position signal into the control unit 14. The inhibitor switch 22 functions as a select position detector of the present invention.

The drive shaft 4 of the select lever 2 is provided with a torque sensor 12 that detects input torque applied from the select lever 2 to the drive shaft 4 and outputs an input torque signal inputted to the control unit 14. The drive shaft 4 is also provided with a position sensor 13 that detects a stroke angle of the select lever 2 and outputs a stroke angle signal inputted to the control unit 14. Note that the torque sensor 12 and the position sensor 13 function as an input torque detecting unit and an operating position detecting unit of the present invention respectively. The stroke angle signal corresponds to a signal of the operating position of the present invention.

As shown in FIG. 2, the torque sensor 12 is composed of a torsion bar 12a, connected to the drive shaft 4 and a case of the select lever device 1, and a detecting portion 12b that detects a torsional torque based on torsion of the torsion bar 12. The connection and torsion detection of the torsion bar 12a between the drive shaft 14 and the case of the select lever device 1 allows the torque sensor 12 to detect the operating force of the driver actually inputted to the select lever 2 and output the input torque signal as output voltage.

The output voltage of the torque sensor 12 is inputted to the control unit 14, so that the control unit 14 recognizes an input torque from the output voltage of the torque senor 12. Note that the control unit 14 functions as an assist control unit of the present invention.

The position sensor 13 is constituted as, for example, a potentiometer, and detects the stroke angle of the operated select lever 2, when necessary, relative to the angle of the select lever 2 when in the utmost end of Parking (P) position, which is defined as zero degree.

FIG. 4 shows the correspondence relationship between the output voltage of the position sensor 13 and the stroke angle of the select lever 2. In the drawing, the vertical axis represents the output voltage of the position sensor 13 and the horizontal axis represents the stroke angle of the select lever 2. The control unit 14 recognizes the stroke angle of the select lever 2 from the output voltage inputted thereto from the position sensor 13, based on the correspondence relationship between the output voltages and the stroke positions as shown in the table in FIG. 5. The correspondence relationship therebetween shown in FIG. 5 is stored in a set value storing unit 23 shown in FIG. 1 as operating position set data of the position sensor 13 and is readable by the control unit 14.

FIG. 5 shows the summary of the correspondence relationship between the output voltages of the position sensor 13 and the stroke positions of the select lever 2.

Figure 8:
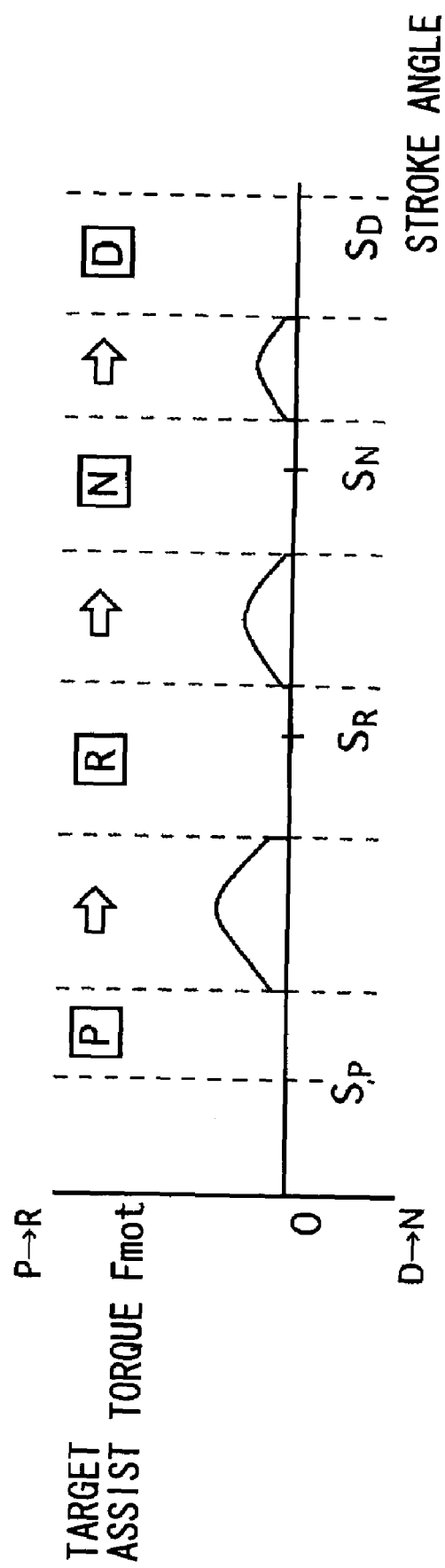
FIG. 8 is a target assist torque map for the operation of the select lever in the direction from P position to R position.

The control unit 14 computes a target assist torque, which is a target value of assist torque to be outputted by the electric motor 7, based on the detected stroke angle of the select lever 2 and a preset target assist torque map shown in FIG. 8. The control unit 14 then corrects the target assist torque according to an actual input torque obtained from the torque sensor 12 and determines an output duty ratio of a drive power output signal to drive the electric motor 7 under pulse width modulation (PWM) control based on the corrected target assist torque. The electric motor 7 is supplied with the drive power output signal to output the assist torque. The drive power output signal corresponds to an assist control signal of the present invention.

Next, the construction of the detent mechanism 9 will be described.

FIG. 3 is a perspective view showing the construction of the detent mechanism 9 provided in the automatic transmission 8.

As shown in FIG. 3, the detent mechanism 8 includes a detent plate 16 having a cam and driven by the rotary shaft 15 and a detent pin 18 urged to the cam of the detent plate 16 by spring plate 17. The rotary shaft 15 is fixed to a lower end of the driven arm 10 and integrally connected with the detent plate 16 to rotate together. The detent plate 16 is provided at its upper end with the cam having top portions 16a and bottom portions 16b formed between the adjacent top portions 16a. The bottom portions 16b are correspond to four select positions (P, R, N, D) respectively. The detent pin 18 is formed at a tip of the spring plate 17 to be pressed onto the top portions 16a and the bottom portions 16b of the detent plate 16. With this construction, the detent mechanism 9 detains the select lever 2 in a select position by having the detent pin 18 locked in one of the bottom portions 16b corresponding to the select position.

Specifically, when the driver operates the select lever 2 in the front-rear direction, the longitudinal direction of the vehicle, the operating force is transmitted to the detent plate 16 via the drive lever 5, the connecting rod 11, the driven arm 10, and the rotary shaft 15, which turns the detent plate 16. This turn of the detent plate 16 causes the front-rear movement of the cam with respect to the detent pin 18. When the detent plate 16 thus turns, the detent pin 18 gets over the top portion 16a while bending the spring plate 17, and moves to and is locked in the bottom portion 16b corresponding to the adjacent select position. This results in that the detent pin 18 is detained in this select position together with the select lever 2 by an elastic force of the spring plate 17.

When the detent pin 18 gets over the top portion 16a of the detent plate 16, a shaft torque by a mechanical load, caused by a cam shape of the detent plate 16 and the elastic force of the spring plate 17, acts on the select lever 2 via the drive shaft 4 thereof, which gives a click feeling to the driver when he or she operates the select lever 2 to select the select position.

A parking rod 19 is coupled at its one end portion to the detent plate 16. The parking rod 19 has at the other end a wedge biased by a spring. When shifted to P position, the select lever 2 moves a parking pole 20 via the wedge so that the parking pole 20 is engaged with a parking lock wheel 21. This engagement of the parking pole 20 and the parking lock wheel 21 inhibits the rotation of the parking lock wheel 21 to lock not-shown drive wheels. Consequently, a vehicle is prevented from moving even if a side brake should be loosened, when the vehicle is parked on a sloping road, or in other cases.

Next the operation of the select lever device 1 for the automatic transmission according to the first embodiment will be described.

First, a characteristic of a mechanical load, acting on the select lever 2 when operated in the direction from P position to D position, will be described with reference to FIG. 6.

Figure 6:
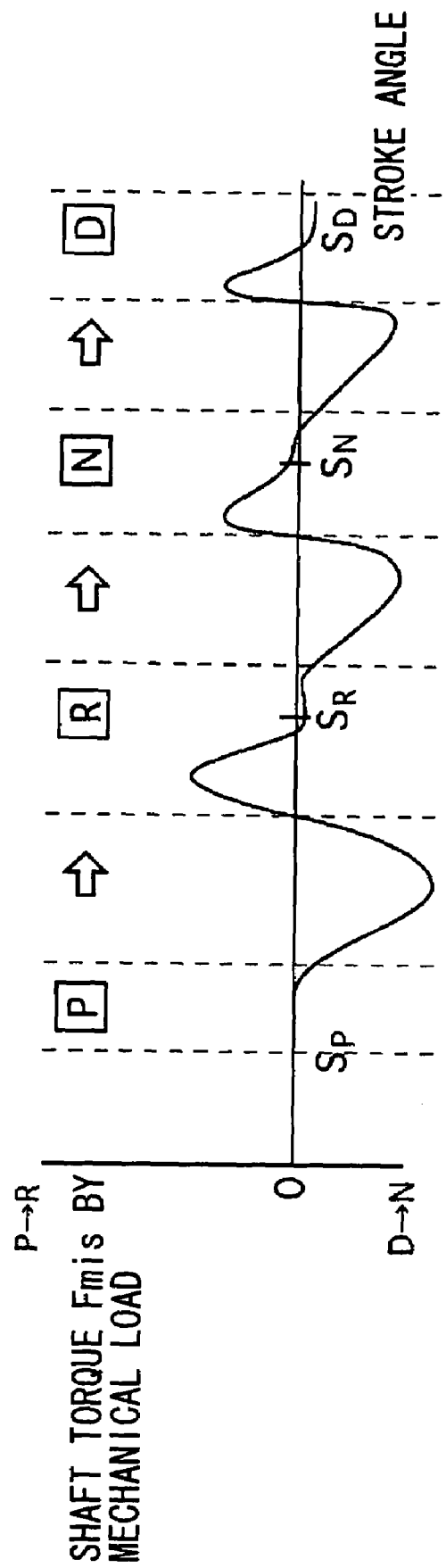
FIG. 6 is a characteristic chart of the mechanical load when the select lever is operated in the direction of from P position to R position.

This mechanical load characteristic shown n FIG. 6 is obtained by measuring a shaft torque Fmis by the mechanical load inputted to the drive shaft 4 of the select lever 2 for each stroke angle of the select lever 2 while the electric motor 7 is not driven.

The shaft torque Fmis by the mechanical load relates to physical values of the mechanical load generated in the detent mechanism 9 of the automatic transmission 8 described above, inertia of the electric motor 7, friction forces generated at joint portions between joint components such as the drive lever 5, the connecting rod 11 and the driven arm 10, and others. Therefore, the select lever 2 operation to shift the select position, without any torque assist by the electric motor 7, requires an operating force that is larger than the shaft torque Fmis by this mechanical load.

As shown in FIG. 6, between the respective select positions, the shaft torque Fmis by the mechanical load generated when shift lever 2 is operated to move in the direction from P position to R position is generated as follows: First, the shaft torque Fmis is generated in a direction (from R position to P position) opposite to the operating direction of the select lever 2. It increases according to increase of the stroke angle of the select lever 2. After reaching its peak, the shaft torque Fmis reverses its direction (to the direction from P position to R position), and decreases to zero near R position that is a select position changeover point (stop point). This rise and fall characteristic is caused by the load generated when the detent pin 18 gets over the top portion 16a of the detent plate 16 in the detent mechanism 9.

Specifically, a resisting force is generated due to the bias force of the spring plate 17 until the detent pin 18 gets over the top portion 16a. After the detent pin 18 has moved up an upward slope of the top portion 16a, the detent pin 18 reaches and goes down a downward slope of the top portion 16a. During this going down movement, a pulling force, caused by the bias force of the spring plate 17, acts the detent pin 18 to drop down to a groove, namely, the bottom portion 16b.

Next, an ideal operating force characteristic when the select lever 2 is operated will be described.

Figure 7:
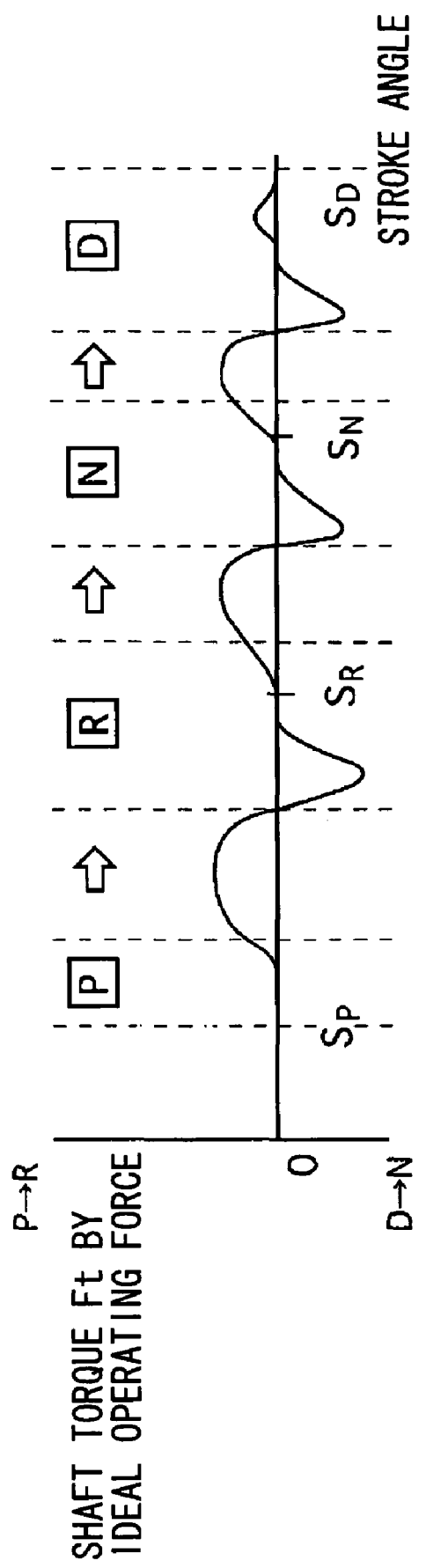
FIG. 7 is a characteristic chart of the ideal operating force of the select lever when the select lever is operated in the direction from P position to R position.

FIG. 7 shows an ideal operating force of the select lever 2 when the select lever 2 is operated in the direction from P position to R position. This ideal operating force is obtained by presetting a shaft torque Ft by an ideal operating force of a driver for each stroke angle of the select lever 2 so that a desirable operating characteristic is obtained in the select operation of the select lever 2.

A target assist torque map is prepared based on both of the above-described mechanical load characteristic of the select lever 2 and ideal operating force characteristic of the select lever 2. FIG. 8 shows the target assist torque map for the operation of the select lever 2 in the direction from P position to R position. A target assist torque Fmot is set in this target assist torque map for each stroke angle of the select lever 2. The target assist torque Fmot is derived by subtracting the shaft torque Ft by the ideal operating force from the shaft torque Fmis by the mechanical load. Therefore, the shaft torque Ft by the aforementioned ideal operating force is obtainable when the assist torque of the electric motor 7 is controlled to be equal to the target assist torque Fmot as a target value.

The mechanical load characteristics are different from each other between the select operations in the direction from D position to N position and in the direction from P position to R position. Therefore, the target assist torque map is independently set according to this mechanical load characteristic and so on. This means that in the assistant control of the select lever 2, it is necessary to detect the operating direction of the select lever 2 to control the assist torque, using the target assist torque map, corresponding to the operating direction.

Note that data in the map in FIG. 8 on the mechanical load characteristic are stored in a characteristic data storing unit 24 shown in FIG. 1 and are readable by the control unit 14.

The operating direction of the select lever 2 can be detected by any one of the following methods: judgment based on the plus or minus output voltage state of the torque sensor 12; judgment based on the incremental or decremental difference of a current obtained value from a last obtained value of the stroke angles detected by the position sensor 13; judgment based on whether or not the stroke angle detected by the position sensor 13 is larger than a median of the stop point in each select position in the target assist torque map; and other method.

The plural target assist torque maps are set in advance according to the operating speed of the select lever 2. The operating speed of the select lever 2 can be deduced by the computation of a rate of change in the stroke angle detected by the position sensor 13, or by other method.

The select lever device 1 according to this embodiment executes the following assist control process, making use of the target assist torque map prepared in the above-described manner.

Figure 9:
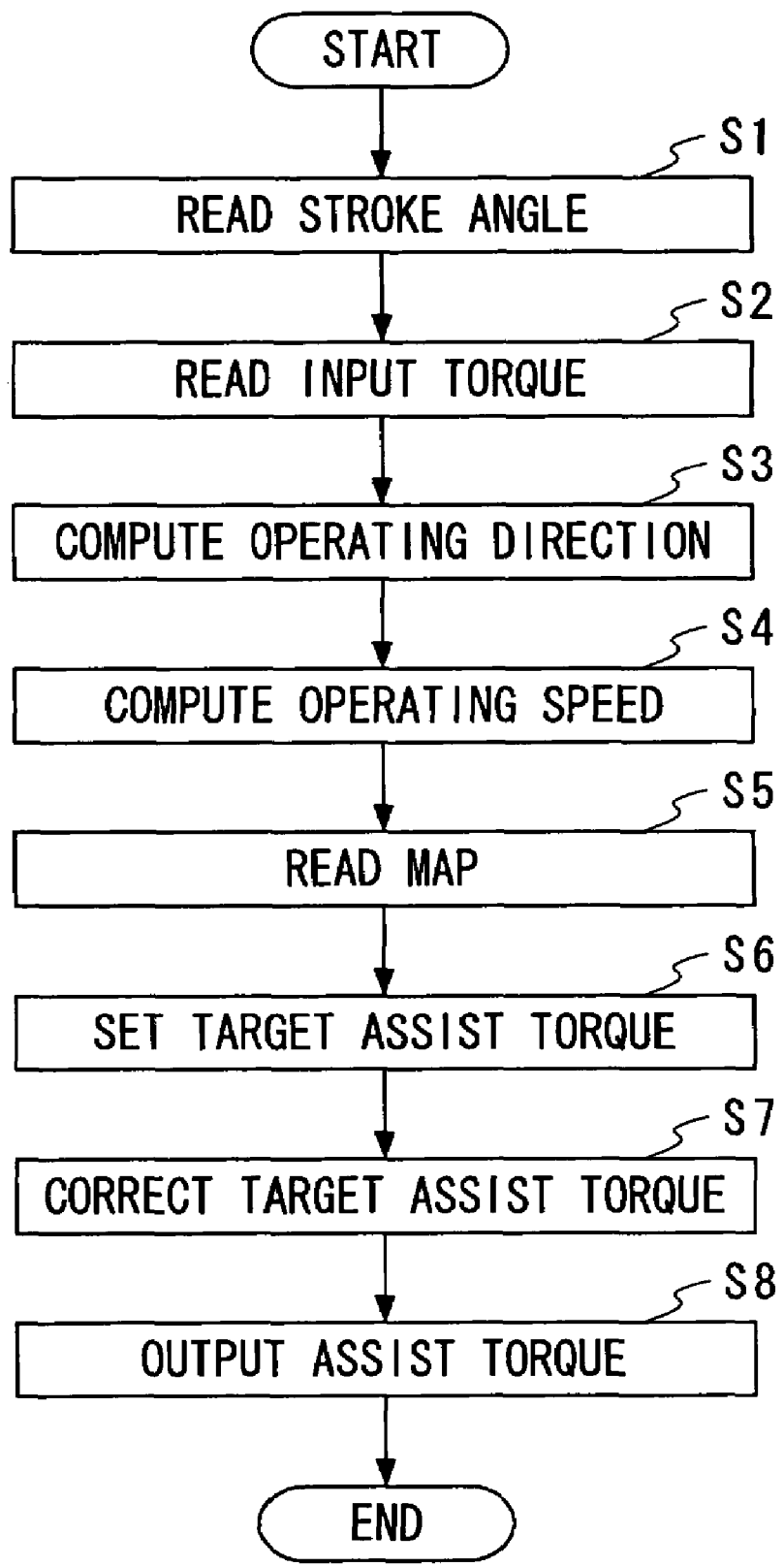
FIG. 9 is a flowchart showing the flow of an assist control process executed in a control unit of a select lever device for an automatic transmission according to a first embodiment of the present invention.

FIG. 9 is a flowchart showing the flow of the assist control process executed in the control unit 14.

In the flowchart of FIG. 9, at step S1, the control unit 14 reads the stroke angle of the select lever 2 based on the stroke angle signal outputted from the position sensor 13. At step S2, the control unit 14 reads the input torque based on the input torque signal outputted from the output voltage of the torque sensor 12.

At step S3, the control unit 14 computes the plus or minus output state of the torque to judge the operating direction of the select lever 2 based on the input torque signal. At step S4, the operating speed of the select lever 2 is obtained by computing the rate of change of the stroke angle relative to the last read stroke angle based on the stroke angle signal.

At step S5, the target assist torque map corresponding to the operating direction and the operating speed of the select lever 2 is read.

At step S6, the target assist torque is set based on the read target assist torque map and the detected stroke angle.

At step S7, the actual input torque and the target assist torque are compared, and the target assist torque is corrected when the difference therebetween is equal to or larger than a predetermined value. The control unit 14 executing step S7 corresponds to a target assist torque correcting means of the present invention.

At step S8, the electric motor 7 is driven so that the corrected target assist torque is obtained, and then this control is finished.

The state of the operation of the select lever assist in the above-described assist control process of the select lever 2 will be described with reference to FIG. 10. Here, the operation of the assist control by the control unit 14 is described, taking as an example a case where the select lever 2 is shifted at a constant speed for the select operation in the direction from P position to R position.

Figure 10:
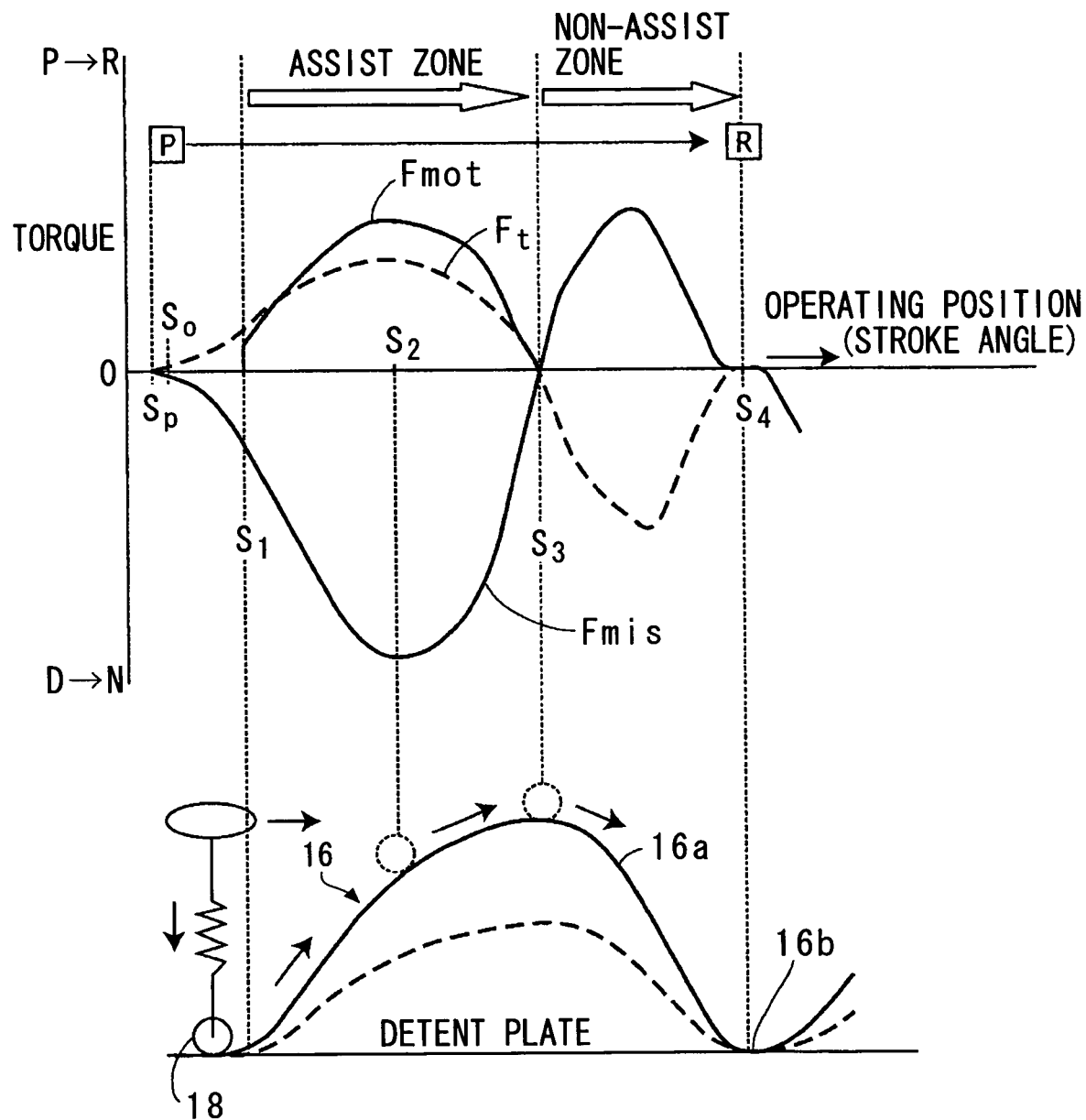
FIG. 10 is a chart illustrating the operation of the assist control executed in accordance with the flowchart in FIG. 9 when a detent pin gets over a top portion of a detent plate.

In FIG. 10, when in P position, the select lever 2 is in halt at a stroke angle $S_0$, i.e., between a stroke angle $S_p$ in a P position side fixed end and a stroke angle $S_1$ representing the median of the stop point in P position.

When the select lever 2 is operated from P position to R position, the detent pin 18 begins to move up the top portion 16a of the detent plate 16, and with this rise movement, the shaft torque Fmis by the mechanical load starts to act in the direction from R position to P position to put up a resistance to the operating force.

At the stroke angle $S_1$, the electric motor 7 starts its assist, so that the assist torque Fmot is generated in the direction from P to R position. The shaft torque Fmis by the mechanical load gradually increases between the stroke angle $S_1$ and the stroke angle $S_2$, and the assist torque Fmot also gradually increases accordingly.

At the stroke angle $S_2$, the shaft torque Fmis by the mechanical load reaches its peak value, and the assist torque Fmot also reaches its peak value accordingly. After reaching the peak, the shaft torque Fmis by the mechanical load gradually decreases between the stroke angle $S_2$ and the stroke angle $S_3$, and the assist torque Fmot also gradually decreases accordingly.

At the stroke angle $S_3$, the detent pin 18 reaches the peak of the top portion 16a of the detent plate 16, and the shaft torque Fmis by the mechanical load becomes zero. At this time, the output of the assist torque Fmot by the electric motor 7 is stopped.

Between the stroke angle $S_3$ and the stroke angle $S_4$, the detent pin 18 is pulled down to the bottom portion 16b of the cam, so that the shaft torque Fmis by the mechanical load is generated in the direction of P position→R position. At this time, only the shaft torque Fmis by the mechanical load acts on the select lever 2.

At the stroke angle $S_4$, the detent pin 18 reaches and stops at a deepest portion of the bottom portion 16b of the detent plate 16. At this time, the shift from P position mode to R position mode (such as shifting the not-shown manual valve of the automatic transmission 8) is also made in the automatic transmission 8, and a not-shown reverse brake of the automatic transmission 8 is engaged, thereby producing a state allowing reverse drive.

Next, the advantages of the assist control based on the mechanical load characteristic in the select lever device 1 for the automatic transmission according to this embodiment will be described.

Here, for better understanding of the advantages of the select lever device 1 of this embodiment, another select lever device without detecting a stroke angle of a select lever will be described for comparison. The select lever device of this embodiment uses the stroke angle of the select lever 2 for the assist control, while another comparative one uses only input torque from the torque sensor 12, not the stroke angle, for the assist control.

In this control of another comparative one, the output value of the drive power output to the electric motor 7 is feedback-controlled based only on the input torque from the torque sensor 12.

In the select operation, the torque corresponding to the sum of the shaft torque Ft by the operating force of the driver, the assist torque Fmot of the electric motor 7, and the shaft torque Fmis by the mechanical load is inputted to the drive shaft 4 of the select lever 2. Among these torques, the shaft torque Fmis by the mechanical load greatly varies in its magnitude and direction depending on the position of the select lever 2, as shown in FIG. 6.

However, the torque sensor 12 detects only the operating force of the driver and is unable to detect the shaft torque Fmis by the mechanical load, so that the shaft torque Fmis by the mechanical load is not reflected in the control. Consequently, so-called jerk sometimes occurs depending on the operating speed of the select lever 2 when the select lever 2 passes a position where the direction of the shaft torque Fmis by the mechanical load changes, for example, a position near the stroke angle $S_3$ in FIG. 10. As a result, in some cases, an ideal operating characteristic cannot be obtained.

Further, if the operating force of the driver is large at a position where the shaft torque Fmis by the mechanical load becomes zero, i.e. immediately after the detent pin 18 has got over the top portion 16a of the detent plate 16, a large assist torque is generated accordingly. This causes the select lever 2 to be pulled in the operating direction against the driver's intention when the select lever 2 passes the select position. Consequently, the select lever 2 does not stop at a position where it should be and the detent pin 18 passes the deepest end of the bottom portion 16b of the detent plate 16. This causes a lack of a well-modulated operating feeling and a lack of a click feeling.

In contrast, the select lever device 1 of this embodiment controls the assist torque based on the mechanical load characteristic for each stroke angle of the select lever 2, so that it is possible to obtain the shaft torque Ft by a desired ideal operating force without being influenced by the shaft torque Fmis by the mechanical load described above.

Incidentally, in the above description, the select lever 2 is shifted in the direction from P position to R position, but the present invention is similarly applicable to the shift between the other positions, and the same advantages are obtainable. Further, the same advantages as that of this embodiment is also obtainable when the select lever 2 is operated in the direction opposite to the above-described operating direction, such as in the direction from D position to N position. In this case of operating the select lever 2 in opposite direction, a target assist torque may be set different from the target assist torque Fmot in FIG. 8.

In the select lever device 1 of this embodiment, the output of the assist torque by the electric motor 7 is stopped when the absolute value of the shaft torque Fmis by the mechanical load is smaller than the predetermined value, but the structure in which the assist torque is continuously generated may be adopted.

In the select lever device 1 of this embodiment, between the stroke angle $S_3$ and the stroke angle $S_4$, the target assist torque is set to zero and the output of the assist torque Fmot by the electric motor 7 is stopped, but the target assist torque may be set in the direction opposite to the operating direction of the select lever 2 to generate the assist torque Fmot in the direction for reducing the pulling force of the shaft torque Fmis by the mechanical load.

As is understood from the above description, the select lever device 1 of the first embodiment of the present invention can bring about the following advantages.

The select lever device 1 of the first embodiment of the present invention measures the shaft torque Fmis by the mechanical load for each stroke angle of the select lever 2 in advance, and controls the assist torque based on the target assist torque Fmot that is set based on the mechanical load characteristic. This makes it possible to obtain a desirable operating characteristic without being influenced by the shaft torque Fmis by the mechanical load.

Further, the select lever device 1 of the first embodiment of the present invention corrects the target assist torque Fmot based on the input torque detected by the torque sensor 12. This makes it possible to obtain, from the operating force of the driver, torque closer to the shaft torque Ft by the ideal operating force and to make more precise setting of the operating characteristic.

Moreover, the select lever device 1 of the first embodiment of the present invention stops the output of the assist torque Fmot when the stroke angle of the select lever 2 is in the range between the stroke angle $S_3$ and the stroke angle $S_4$ in FIG. 10, i.e., where the shaft torque Fmis by the mechanical load acts in the operating direction of the select lever 2. This can prevent the overrun of the select lever 2 from a desired position (the stroke angle $S_4$) and impart the operating characteristic with a click feeling. In this case, only the shaft torque Fmis by the mechanical load acts on the select lever 2, so that a natural operating feeling is obtained.

In addition, in the select lever device 1 of the first embodiment of the present invention, the control unit 14 sets the target assist torque based on the target assist torque map shown in FIG. 8. Therefore, the control unit 14 does not have to make complicated computation. This enables highly responsive control.

Further, in the select lever device 1 of the first embodiment of the present invention, the plural target assist torque maps are prepared according to the operating speed of the select lever 2, so that it can cope with the mechanical load characteristic that varies depending on the operating speed of the select lever 2. This enables the optimum setting of the operating characteristic for each operating speed.

Next, a select lever device according to a second embodiment of the present invention will be described with reference to the drawings.

In a select lever device 1 according to this embodiment, which also has the similar construction as that of the select lever device 1 according to the first embodiment shown in FIG. 1 to FIG. 3, and the correspondence relationship between the stroke angle of a select lever 2 and the output voltage of a position sensor 13 as shown in FIG. 4 is stored in a characteristic data storing unit.

Figure 11:
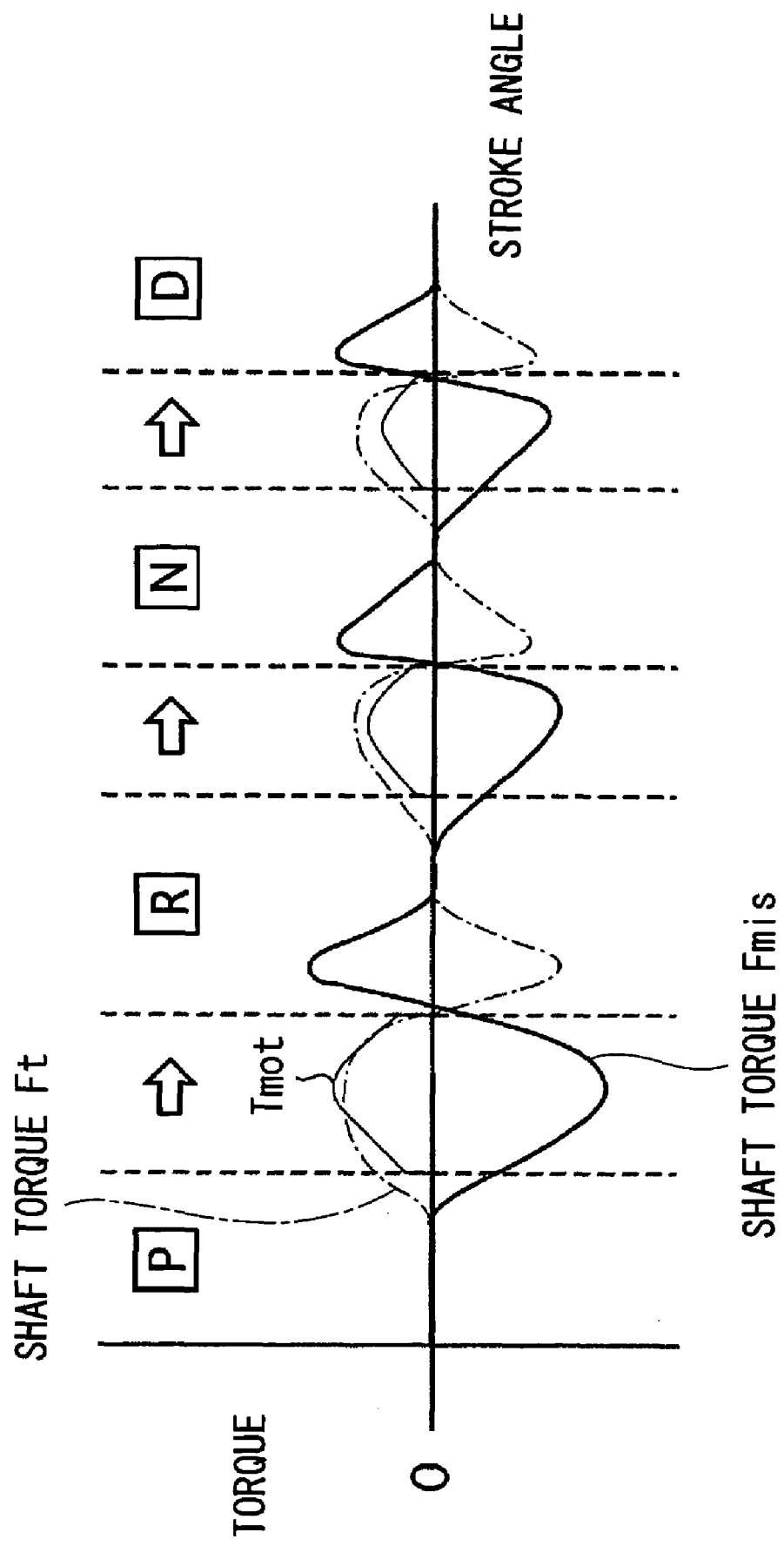
FIG. 11 is a target assist torque map in the operation in the direction from P position to R position, the map being used in a select lever device for an automatic transmission according to a second embodiment of the present invention.

In the select lever device 1 according to this embodiment, a control unit 14 computes a target assist torque that is a target value of assist torque to be outputted by an electric motor 7, based on a target assist torque map shown in FIG. 11 representing the relationship between a detected stroke angle of the select lever 2 and the preset target assist torque. Next, the target assist torque is corrected according to an actually detected input torque, and determines an output duty ratio of a drive power output signal to drive the electric motor 7 under PWM control based on the corrected target assist torque. The electric motor 7 is supplied with the drive power output signal to output the assist torque.

FIG. 11 is a target assist torque map in the operation in the direction from P position to R position. A target assist torque Tmot for each stroke angle of the select lever 2 is set in this target assist torque map. The target assist torque Tmot is derived by subtracting a shaft torque Ft by an ideal operating force from a shaft torque Fmis by a mechanical load. Then, the assist torque of the electric motor 7 is controlled to be equal to the target assist torque Tmot as a target value. This makes it possible to obtain the shaft torque Ft by the ideal operating force of a driver that will be a desirable operating force in the select operation.

In the select operation in the direction from D position to N position, a mechanical load Fmis presents a different characteristic from that of the above-described mechanical load in the direction from P position to R position. Therefore, a separate target assist torque map is also set according to this mechanical load characteristic. This means that in the assist control of the select lever 2, it is necessary to detect the operating direction of the select lever 2 to control the assist torque using the target assist torque map corresponding to the operating direction.

Next, the operation of the select lever device 1 according to the second embodiment of the present invention will be described.

First, it is necessary for the control unit 14 to eliminate the difference between the select position obtained from an inhibitor switch 22 on an automatic transmission 8 side and the position detected by the position sensor 13 on a select lever device 1 side before the start of the assist control.

For this purpose, the control unit 14 executes the following correction process when the driver's hand does not touch the select lever 2, that is, when the input torque to the select lever 2 is zero. The control unit 14 compares an actual output voltage inputted from the position sensor 13 and an output voltage corresponding to the stroke angle of the select lever 2 stored in the operating position set data shown in FIG. 4 based on the output voltage inputted from the position sensor 13 and a stop point signal in the select position inputted from the inhibitor switch 22. Then the control unit 14 calculates a difference amount therebetween to correct the operating position set data according to the difference amount.

Figure 12:
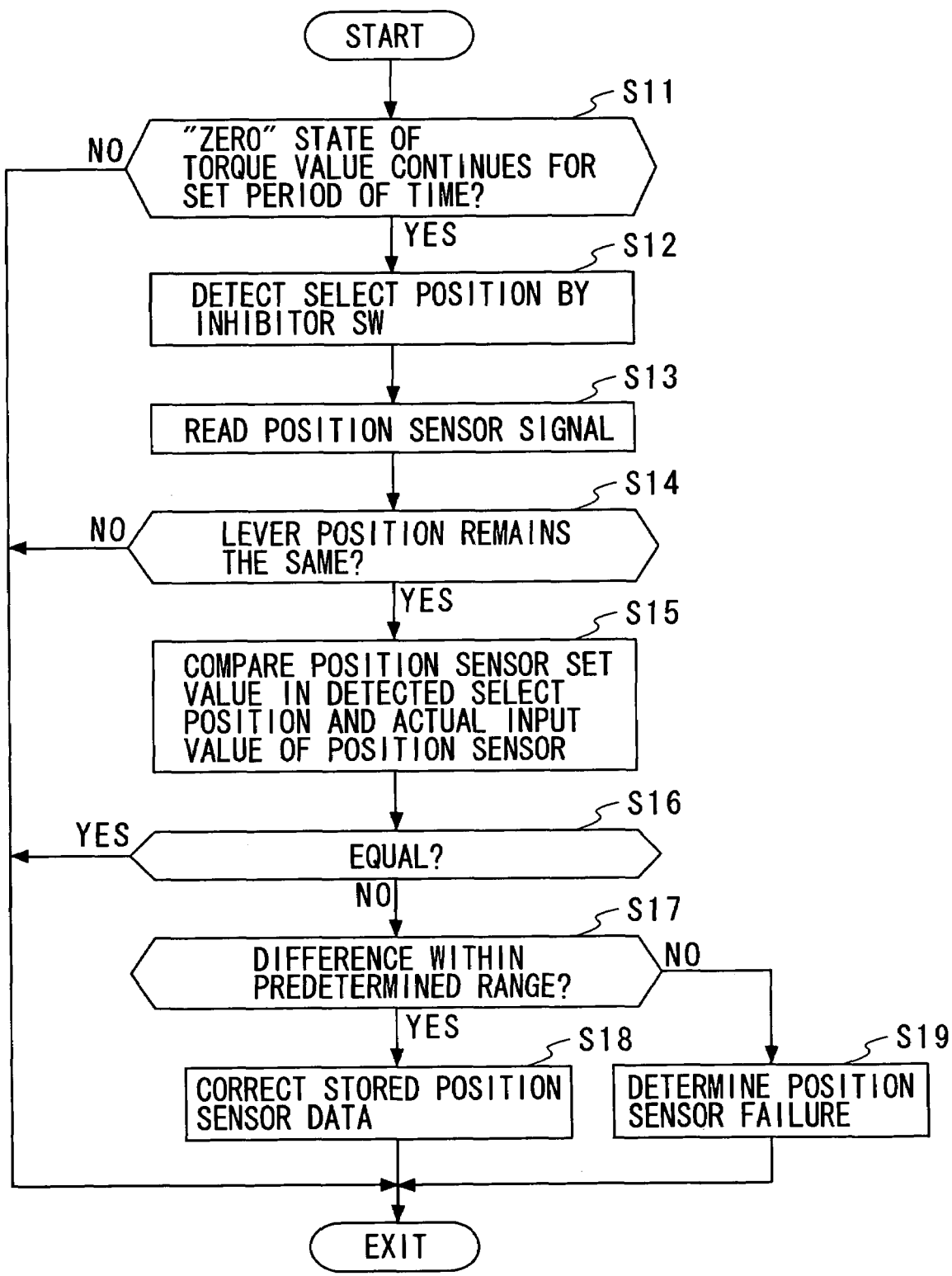
FIG. 12 is a flowchart showing the flow of a control process for operating position set data correction executed in a control unit of the select lever device for the automatic transmission according to the second embodiment of the present invention.

FIG. 12 is a flowchart showing the flow of a control process for operating position data correction executed in the control unit 14. This process can be executed in an arbitrary select position.

At step S11, the control unit 14 reads the output voltage of a torque sensor 12 and judges whether or not a zero state of the input torque has continued for a preset period of time. The control unit 14 executing the step S11 corresponds to a halt judging means of the present invention. If YES, the flow goes to step S12, while, if NOT, this control is finished.

At step S12, the current select position is detected from the select position signal of the inhibitor switch 22. At step S13, the output voltage of the position sensor 13 is read.

At step S14, a current obtained value and a last obtained value of the position sensor 13 are compared and it is judged whether or not the position of the select lever 2 has remained the same. If YES, the flow goes to step S15, while, if NOT, this control is finished.

At step S15, the output voltage (input value) of the position sensor 13 in the detected select position and the output voltage (set value) corresponding to the stroke angle of the select lever 2, which is stored in the operating position set data, are compared.

At step S16, it is judged whether or not the input value and the set value are equal to each other. If YES, this control is finished, while, if NOT, the flow goes to step S17.

At step S17, it is judged whether or not a difference amount of the set value from the input value is within a predetermined range. If YES, the flow goes to step S18, while, if NOT, the flow goes to step S19. Note that the control unit 14 executing the step S15 to the step S17 corresponds to a difference detecting means of the present invention.

At step S18, set values in other select positions are assumed based on the input value, and the operating position set data are corrected. Then, this control is finished. The control unit 14 executing the step S18 corresponds to an operating position set data correcting means of the present invention.

At step S19, the position sensor 13 is judged to have a failure and the assist control by the electric motor 7 is stopped to finish this control. Note that the control unit 14 executing the step S19 corresponds to a failure judging means and an assist restricting means.

Figure 13:
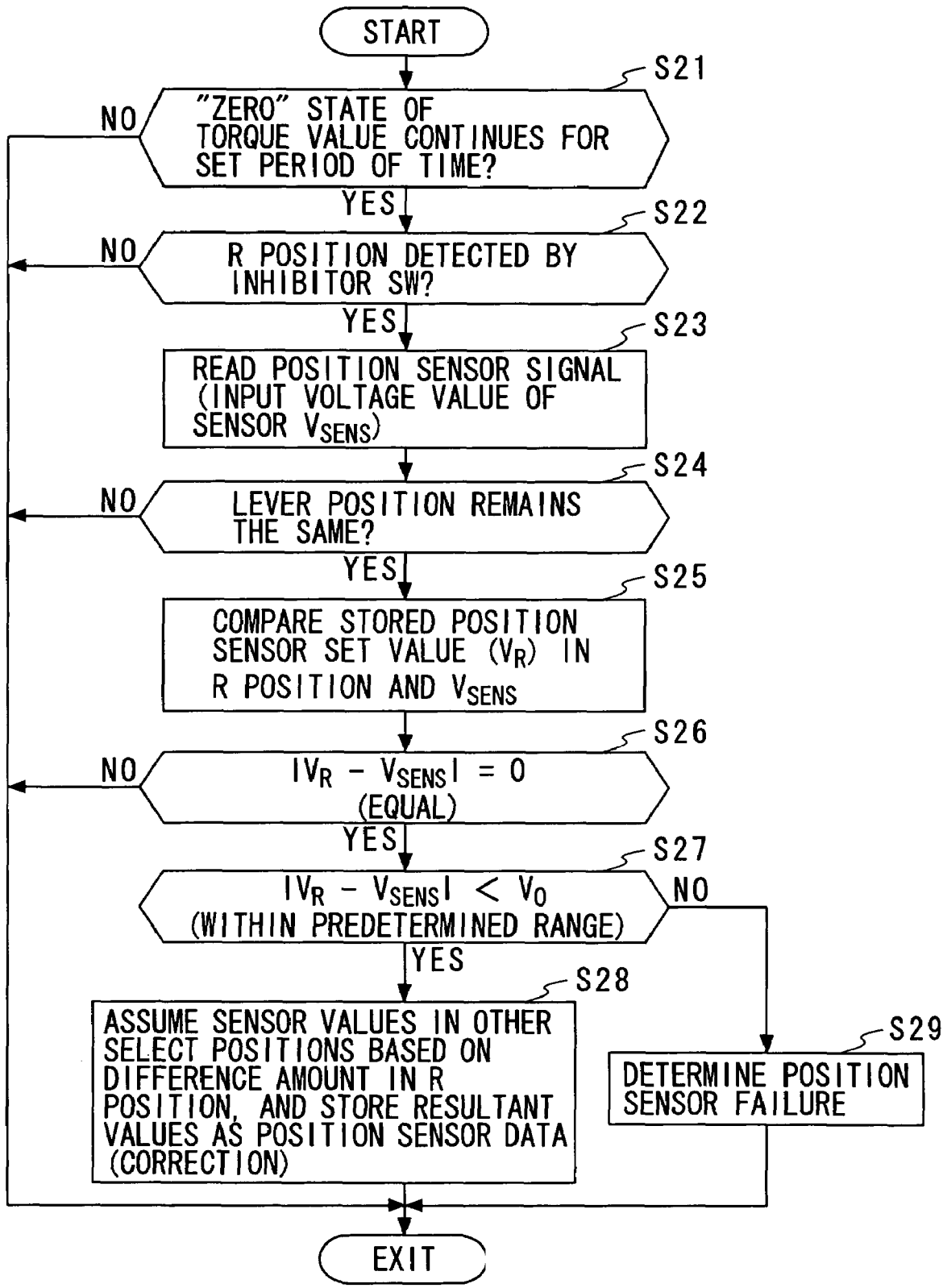
FIG. 13 is a flowchart showing a specific example of the control process for the operating position set data correction executed in R position according to the flowchart in FIG. 12.

Here, as the control process for the operating position set data correction, the control executed in R position will be described as a specific example with reference to FIG. 13.

At step S21, the output voltage of the torque sensor 12 is read and it is judged whether or not the zero state of the input torque has continued for the preset period of time. If YES, the flow goes to step S22, while, if NOT, this control is finished.

At step S22, it is detected from the select position signal of the inhibitor switch 22 whether or not the current select position is R position. If YES, the flow goes to step S23, while, if NOT, this control is finished.

At step S23, an input value $V_{SENS}$ of the position sensor 13 is read.

At step S24, the current obtained value and the last obtained value of the position sensor 13 are compared and it is judged whether or not the position of the select lever 2 has remained the same. If YES, the flow goes to step S25, while, if NOT, this control is finished.

At step S25, the input value $V_{SENS}$ and a set value $V_R$ stored in the operating position set data shown in FIG. 4 are compared. If the input value $V_{SENS}$ is different from the set value $V_R$, the flow goes to step S26, while if the input value $V_{SENS}$ is equal to the set value $V_R$, this control is finished.

At step S26, it is judged whether or not the input value $V_{SENS}$ and the set value $V_R$ are equal to each other, namely, $|V_{SENS}-V_R|=0$. If YES, this control is finished, while if NOT, the flow goes to step S27. Here, the judgment that the input value $V_{SENS}$ and the set value $V_R$ are equal to each other may be made when the difference therebetween is equal to or less than a certain threshold value, instead of when $|V_{SENS}-V_R|=0$. This threshold value may be any difference amount to a degree not influential to the assist control. Note that this threshold value corresponds to a first threshold value of the present invention.

At step S27, it is judged whether or not $|V_{SENS}-V_R|$ is smaller than a threshold value $V_0$. If YES, the flow goes to step S28, while, if NOT, the flow goes to Step S29. Note that the threshold value $V_0$ corresponds to a second threshold value of the present invention.

Figure 14:
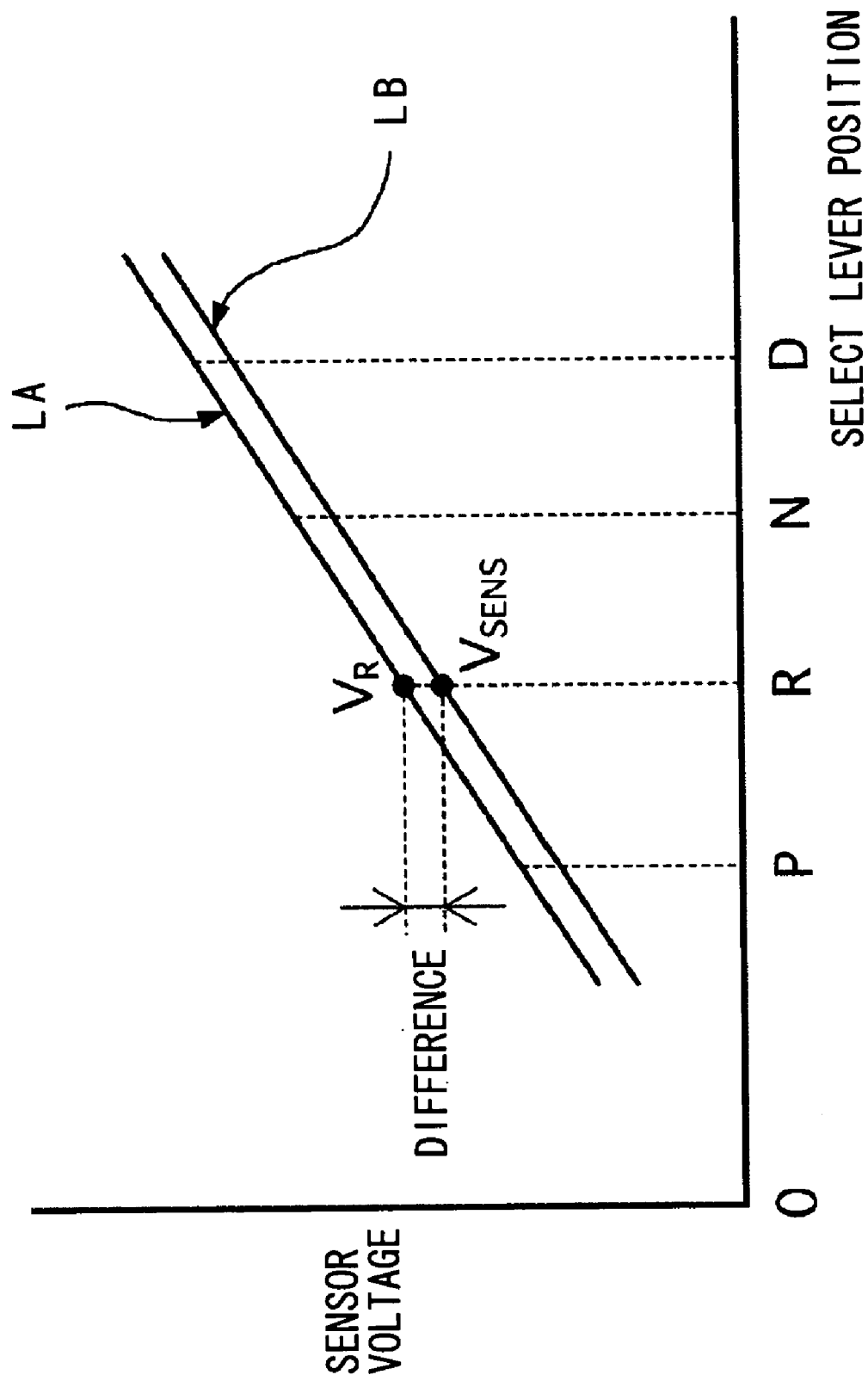
FIG. 14 is a chart showing an example of a method of the operating position set data correction executed in the control unit of the select lever device for the automatic transmission according to the second embodiment of the present invention.

At step S28, the set values in the other select positions, for example, P position, N position, and D position are assumed based on the difference amount ($|V_{SENS}-V_R|$) in R position to correct the operating position set data. FIG. 14 shows an example of a method of correcting the operating position set data. In this correcting method, a straight line LA of the operating position set data is shifted in parallel in advance by the difference amount ($|V_{SENS}-V_R|$) in R position to correct the setting in the other select positions, and the data after the correction are stored as new operating position set data LB.

At step S29, the position sensor 13 is judged to have a failure and the assist control by the electric motor 7 is stopped to finish this control.

In the described example of the select lever device 1 according to the second embodiment, the control process of the operating position set data correction is executed in R position and the straight line of the operating position set data is shifted by the difference amount between the input value and the set value in R position, thereby correcting the setting in the other select positions such as P position, N position, and D position. However, different methods, for example, the following methods shown in FIG. 15 to FIG. 17 may be adopted.

Figure 15:
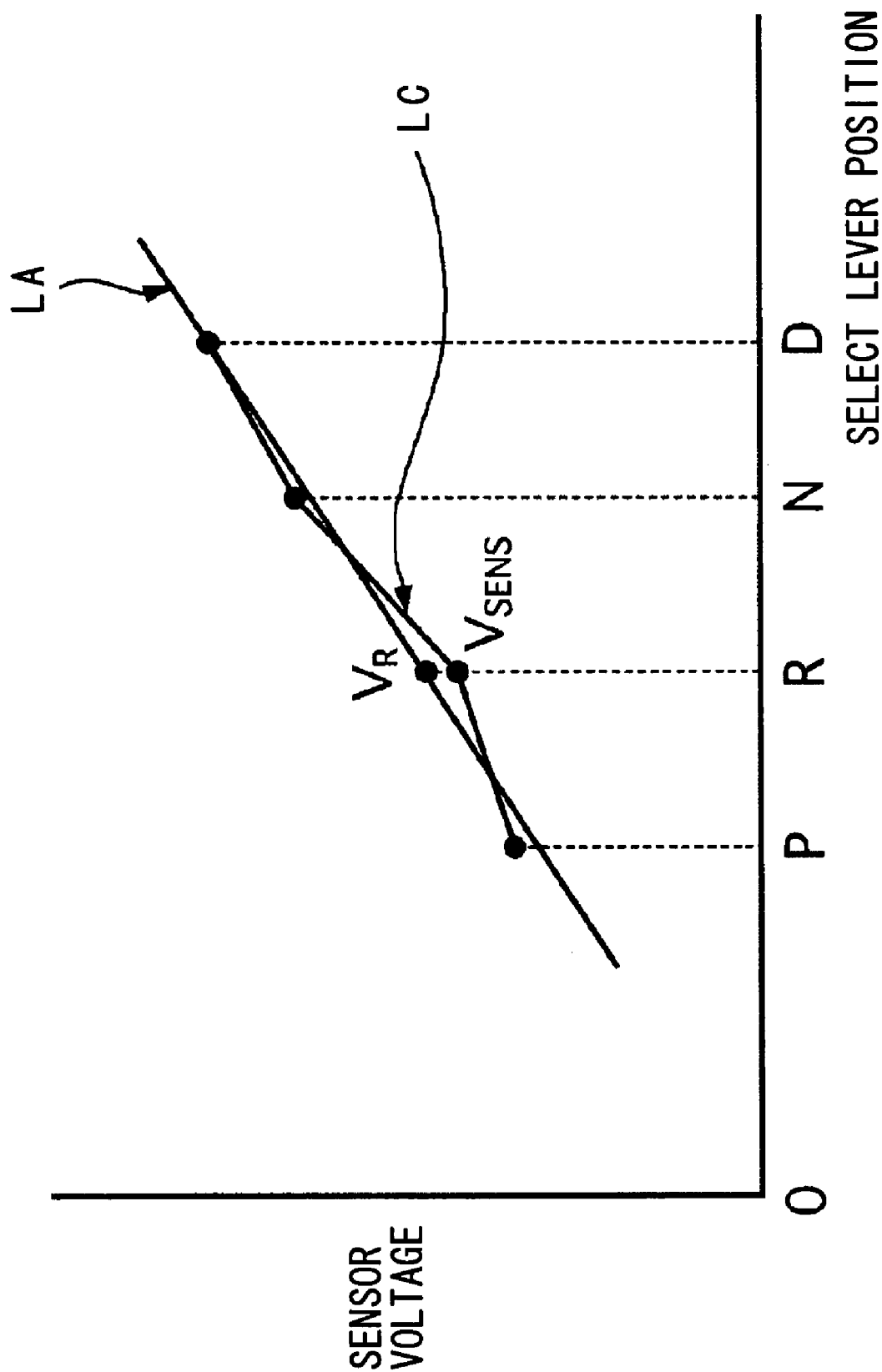
FIG. 15 is a chart showing an example, different from that in FIG. 14, of the method of the operating position set data correction executed in the control unit of the select lever device for the automatic transmission according to the second embodiment of the present invention.

In one of the methods, as shown in FIG. 15, the difference amounts in all the select positions are obtained by comparison, and the respective points are connected by a kinked line, and kinked line data are stored in advance as operating position set data LC in place of the straight line LA of the operating position set data.

Figure 16:
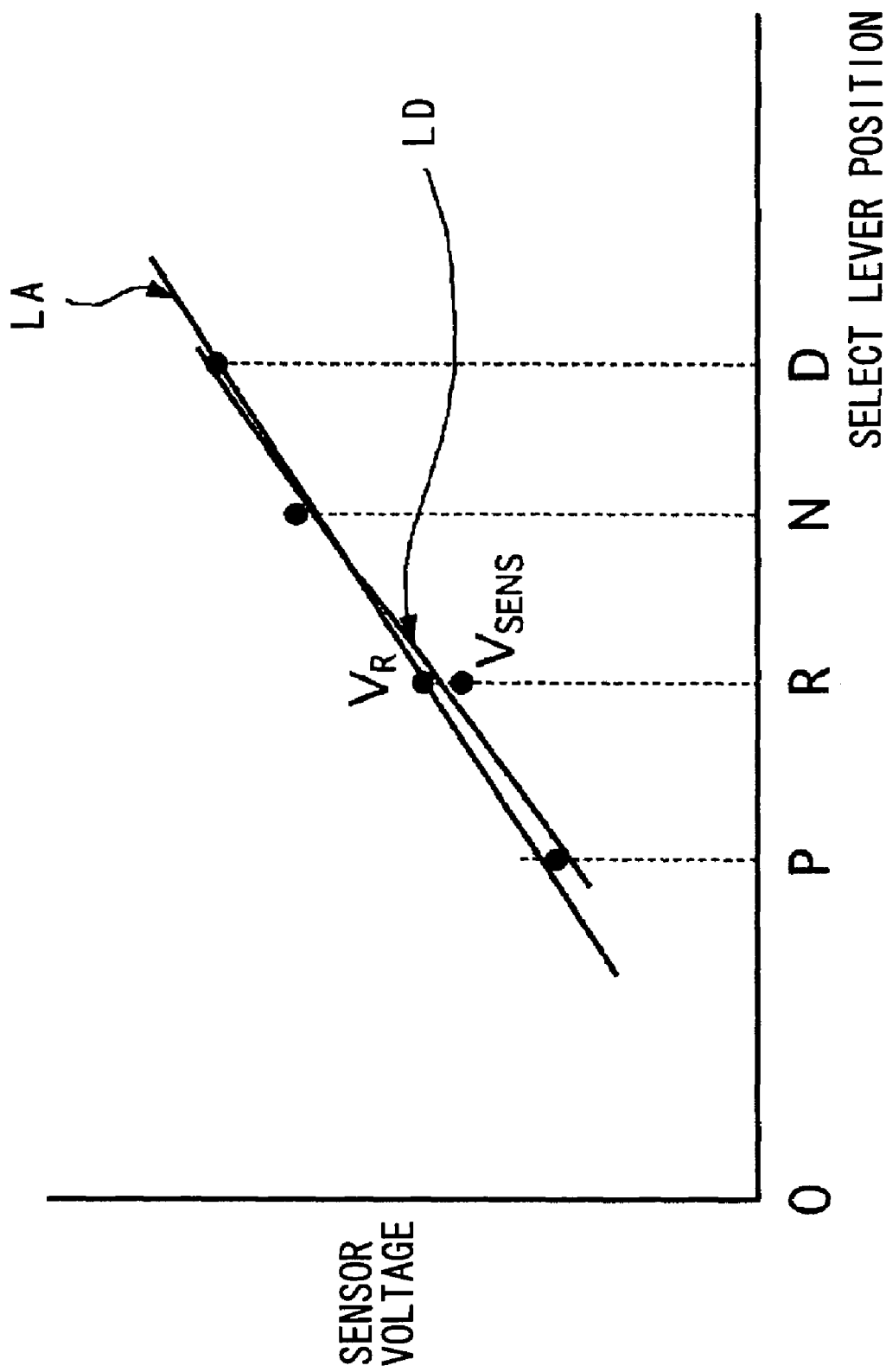
FIG. 16 is a chart showing an example, different from those in FIG. 14 and FIG. 15, of the method of the operating position set data correction executed in the control unit of the select lever device for the automatic transmission according to the second embodiment of the present invention.

In another method, as shown in FIG. 16, the difference amounts in all the positions are obtained by comparison and a straight line obtained by a linear approximation method is stored in advance as operating position set data LD in place of the straight line LA of the operating position set data.

Figure 17:
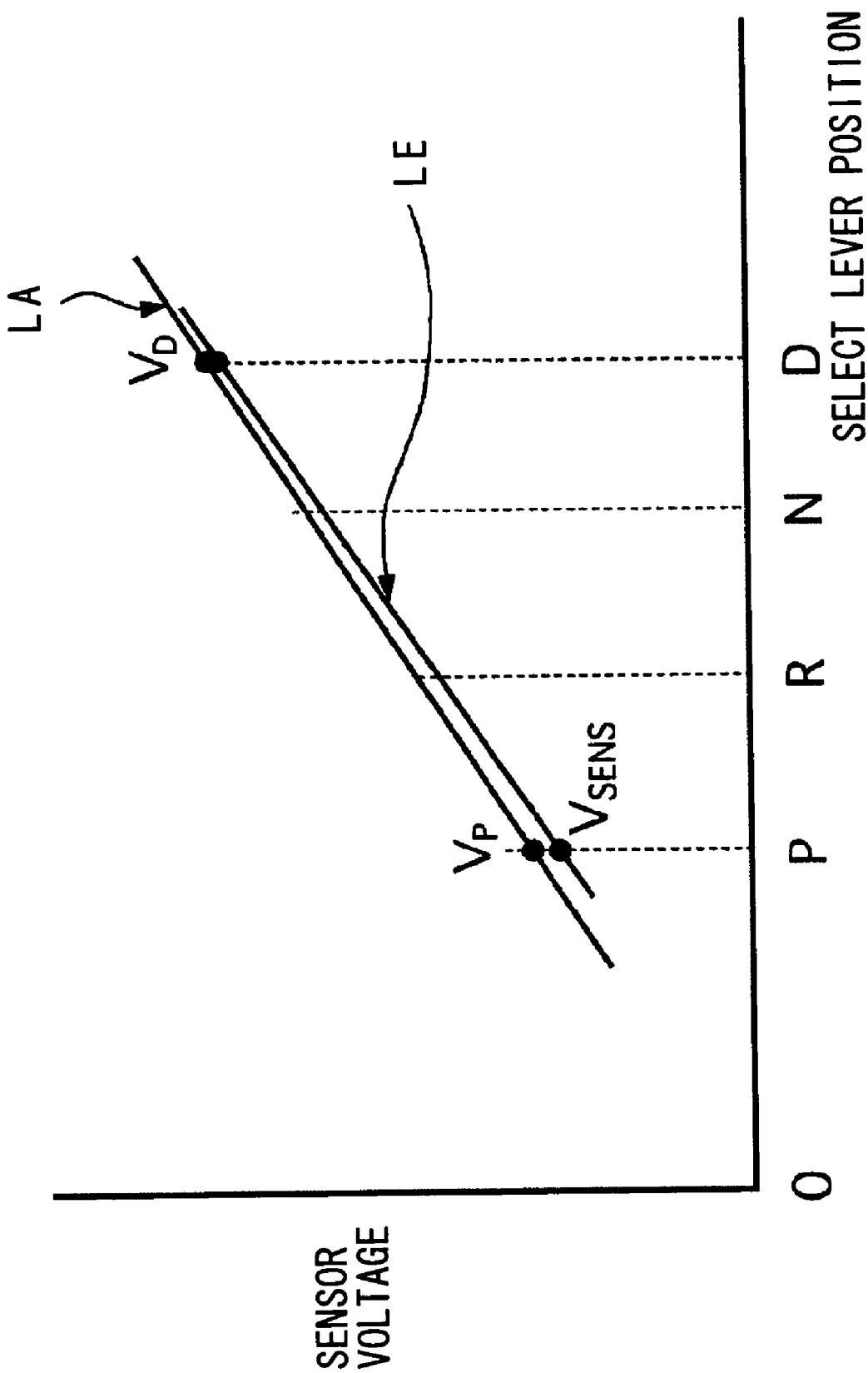
FIG. 17 is a chart showing an example, different from those in FIG. 14, FIG. 15, and FIG. 16, of the method of the operating position set data correction executed in the control unit of the select lever device for the automatic transmission according to the second embodiment of the present invention.

In still another method, as shown in FIG. 17, the difference amounts in given two positions are obtained by comparison and a straight line passing through the two points is stored in advance as operating position set data LE in place of the straight line LA of the operating position set data.

As is understood from the above description, the select lever device 1 of the second embodiment of the present invention can bring about the following advantages.

The select lever device 1 of the second embodiment of the present invention detects the difference amount between the input value $V_{SENS}$ of the position sensor 13 and the set value $V_R$ stored in the operating position set data shown in FIG. 4. When the detected difference amount $|V_{SENS}-V_R|$ is larger than zero and smaller than the threshold value $V_0$, the straight line of the operating position set data is shifted by $|V_{SENS}-V_R|$, thereby correcting the setting in the other select positions, and the data after the correction are stored as the new operating position set data. This makes it possible to constantly make proper assist control.

Further, the select lever device 1 of the second embodiment of the present invention makes the difference correction while the input torque to the select lever 2 is zero. Therefore, the stop point of the select lever 2 in each select position obtained by the inhibitor switch 22 can be specified in advance. This enables accurate difference correction for calibration.

Moreover, the select lever device 1 of the second embodiment of the present invention judges that the select lever 2 is in halt when the zero state of the input torque continues for the preset period of time and the difference between the current obtained value and the last obtained value detected by the position sensor 13 is within the predetermined range. This makes it possible to distinguish the zero state when the driver's hand does not touch the select lever 2 from the zero state of the input torque occurring during the lever operation (see the shaft torque Fmis by the mechanical load in FIG. 6). Consequently, it can be surely judged that the select lever 2 is in halt, which can prevent erroneous correction.

Further, the select lever device 1 of the second embodiment of the present invention judges that the position sensor 13 has a failure when the detected difference amount $|V_{SENS}-V_R|$ is equal to or larger than the threshold value $V_0$ and stops the assist by the electric motor 7. This can prevent the execution of erroneous assist control.

Next, a select lever device according to a third embodiment of the present invention will be described with reference to the drawings.

In a select lever device 1 according to this embodiment, which also has the similar construction as that of the select lever device 1 according to the first embodiment shown in FIG. 1 to FIG. 3, and the correspondence relationship between the stroke angle of a select lever 2 and the output voltage of a position sensor 13 as shown in FIG. 4 is stored in a characteristic data storing unit. The select lever device 1 according to this embodiment further includes an operating speed detecting means to detect the operating speed of the select lever 2. Further, a control unit 14 includes an overrun preventing counter that sets a target value according to the operating speed of the select lever 2 for the purpose of preventing the overrun of the select lever 2 from a desired position, and the output of the assist torque in the next select position is stopped until this target value is reached.

Figure 18:
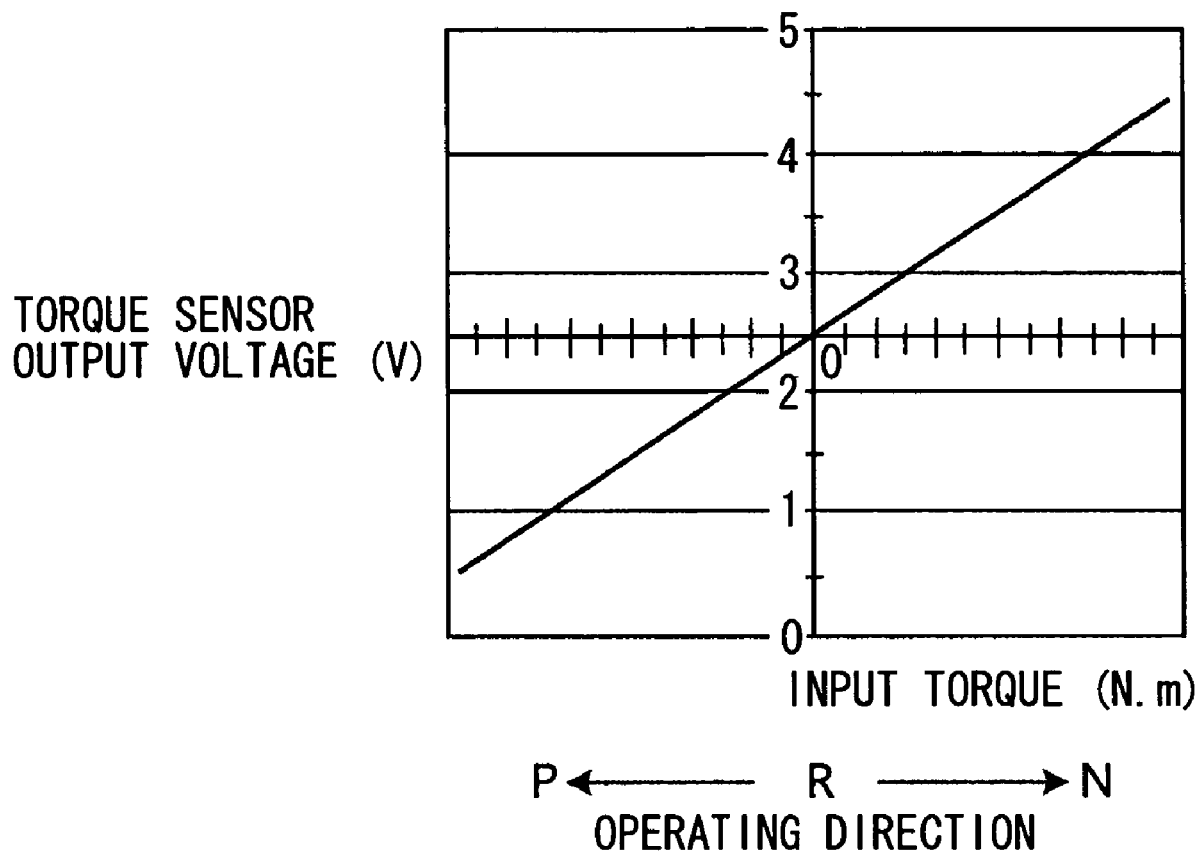
FIG. 18 is a characteristic chart of an input torque vs. an output voltage of a torque sensor used in a select lever device for an automatic transmission according to a third embodiment of the present invention.

The operating direction of the select lever 2 can be determined from the input torque vs. output voltage characteristic of a torque sensor 12 shown in FIG. 18. Specifically, when no torque is inputted to the select lever 2, the output voltage of the toque sensor 12 is 2.5 V. When the select lever 2 is operated in the direction from P position to D position, the output voltage gradually increases to become larger than 2.5 V. On the other hand, when the select lever 2 is operated in the direction from D position to P position, the output voltage gradually decreases to become smaller than 2.5 V.

Therefore, the operation of the select lever 2 in the direction from P position to D position can be judged based on the output voltage when it is larger than 2.5 V, and the operation of the select lever 2 in the direction from D position to P position can be judged based on the output voltage when it is smaller than 2.5 V.

The operating direction of the select lever 2 can be judged by any one of the following methods: judgment based on the incremental or decremental difference of a current obtained value from a last obtained value of the position sensor 13; judgment based on whether or not the stroke angle detected by the position sensor 13 is larger than a median of the stop point in each select position in a target assist torque map; and other method.

A plurality of target assist torque maps are set in advance according to the select position and the operating speed of the select lever 2. The select position can be judged from the stroke angle of the select lever 2, but may be judged from a select position signal of an inhibitor switch 22 normally attached to an automatic transmission 8. The operating speed of the select lever 2 can be deduced from a rate of change in the stroke angle, the rate of change being calculated by the control unit 14 through the division of the difference between a stroke angle and a last stroke angle, which are detected by the position sensor 13, by a time difference therebetween. Note that the position sensor 13 and the control unit 14 correspond to an operating speed detecting means of the present invention.

Figure 19:
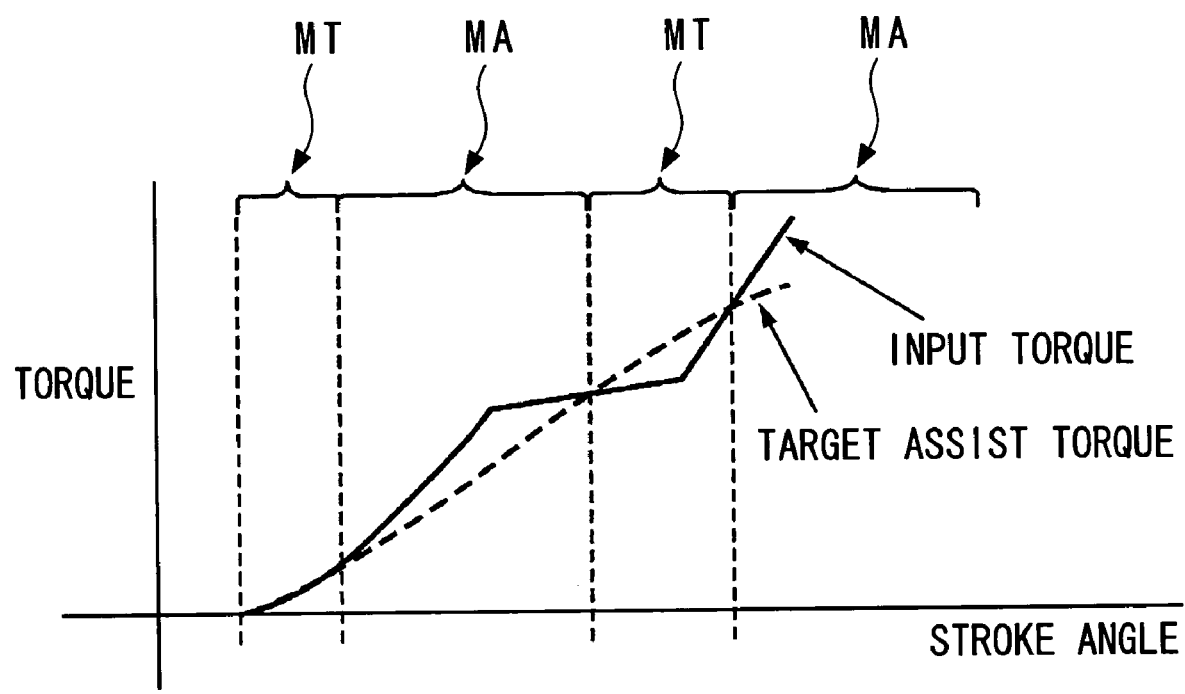
FIG. 19 is a view illustrating an electric motor control method based on the input torque and a target assist torque, executed in the select lever device for the automatic transmission according to the third embodiment of the present invention.

The control unit 14 determines an ON duty ratio of a drive power output signal inputted to an electric motor 7 so that a set target assist torque becomes equal to an input torque detected by the torque sensor 12. Then the control unit 14 controls the electric motor 7 to output the assist torque using duty control. Specifically, as shown in FIG. 19, when a target assist torque is smaller than the actual torque (input torque), the ON duty ratio of the drive power output signal to the electric motor 7 is determined according to the difference therebetween. On the other hand, when the target assist torque is equal to or larger than the actual torque, the output of the electric motor 7 is stopped. In the drawing, the output of the electric motor 7 is stopped in the ranges MT, while the electric motor 7 is driven according to the magnitude of the assist torque in the ranges MA.

Further, when the select lever 2 is operated at a higher speed than a normal speed, the control unit 14 executes overrun preventing control of setting the target value of the overrun preventing counter according to the operating speed and stopping the output of the assist torque in the next select position until the counter reaches the target value.

Next, the operation of the select lever device 1 according to the third embodiment of the present invention will be described.

Figure 20:
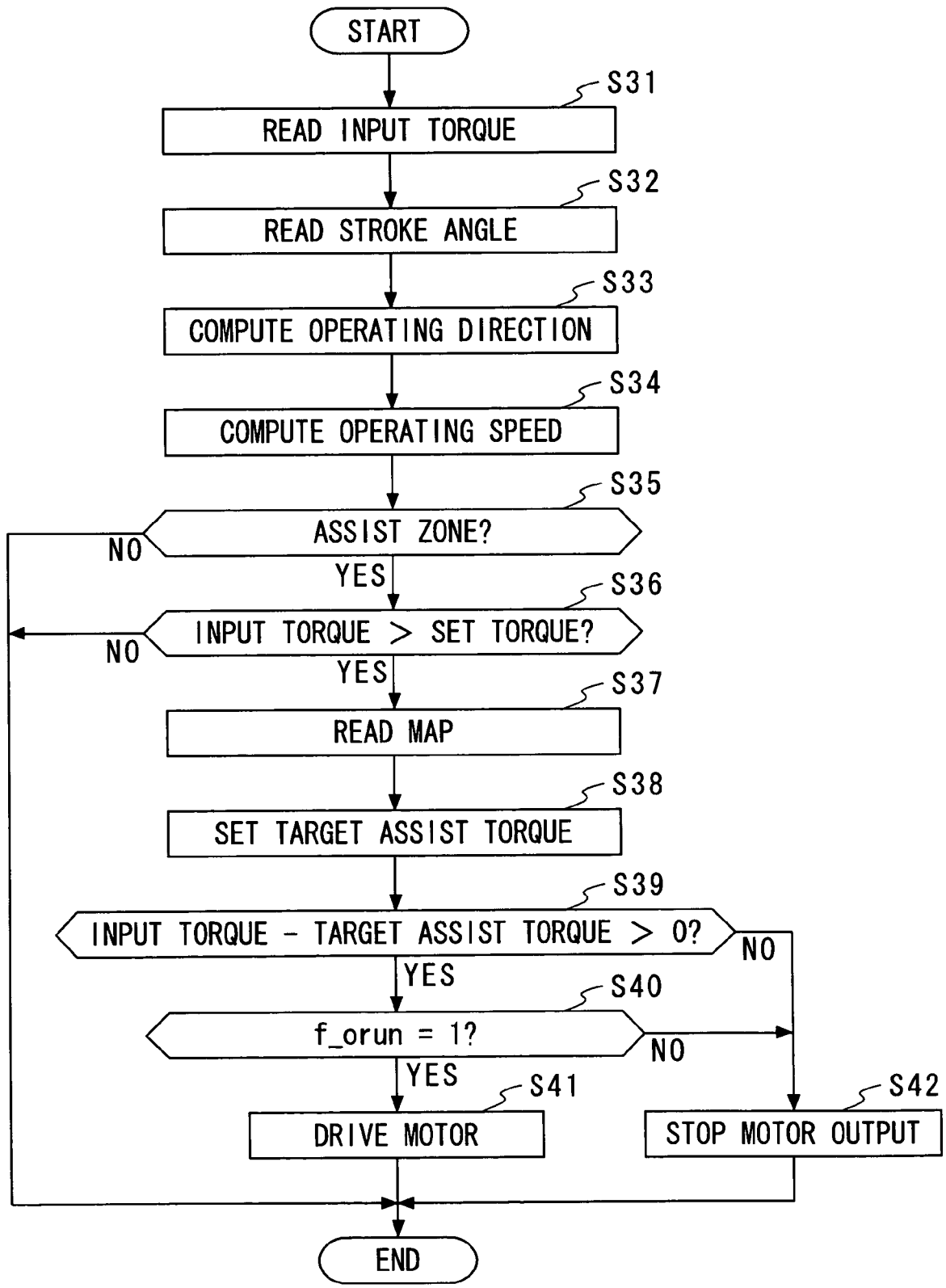
FIG. 20 is a flowchart showing the flow of an assist control process executed in a control unit of the select lever device for the automatic transmission according to the third embodiment of the present invention.

The control unit 14 executes an assist control process according to the flowchart shown in FIG. 20.

At step S31, the control unit 14 reads the input torque of the select lever 2 from the output voltage of the torque sensor 12.

At step S32, the stroke angle of the select lever 2 is read from the output voltage of the position sensor 13.

At step S33, the operating direction of the select lever 2 is computed based on the incremental or decremental difference of the stroke angle from the latest read stroke angle.

At step S34, the operating speed of the select lever 2 is computed from the rate of change of the current stroke angle relative to the latest read stroke angle.

At step S35, it is judged from the stroke angle whether or not the select lever 2 is in an assist zone. If YES, the flow goes to step S36, while, if NOT, this control is finished.

Figure 21:
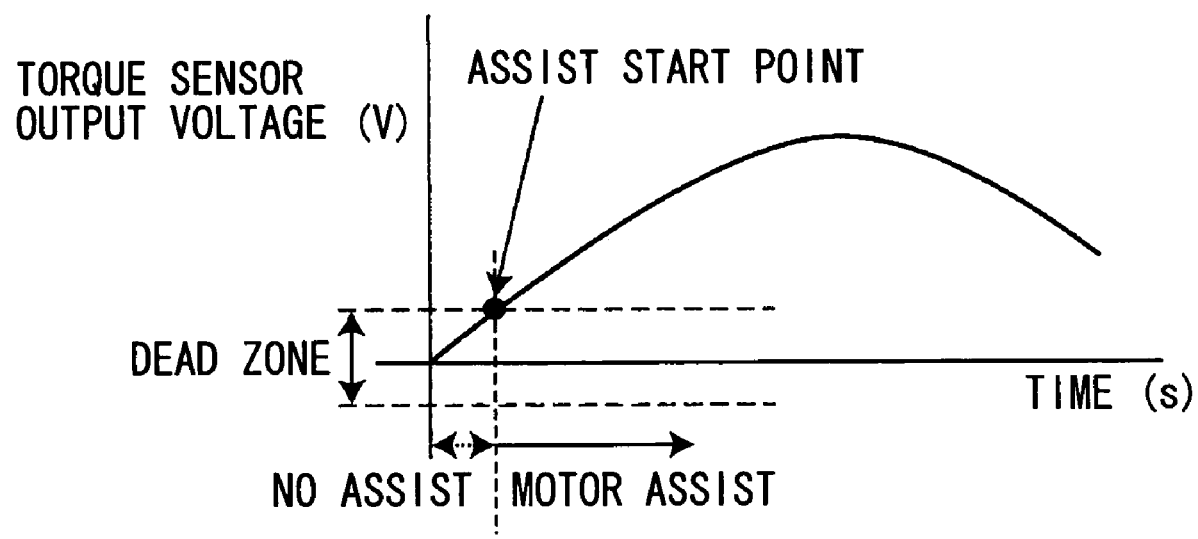
FIG. 21 is a chart illustrating a method of an assist start judging process using the torque sensor, executed in the assist control process executed in accordance with the flowchart in FIG. 20.

At step S36, it is judged whether or not the input torque is larger than the preset torque. If YES, the flow goes to step S37, while, if NOT, this control is finished. Therefore, in this embodiment, when the output voltage of the torque sensor 12 representing the input torque exceeds a voltage value range in a dead zone (a torque range in which no assist is given), the output of the assist torque is started, as shown in FIG. 21.

At step S37, the target assist torque map corresponding to the operating direction and the operating speed of the select lever 2 is read.

At step S38, the target assist torque is set based on the read target assist torque map and the stroke angle.

At step S39, it is judged whether or not the subtraction of the target assist torque from the input torque gives a value larger than zero. If YES, the flow goes to step S40, while, if NOT, the flow goes to step S42.

At step S40, it is judged whether or not an overrun preventing flag f_orun is 1. If YES, the flow goes to step S41, while, if NOT, the flow goes to step S42.

At step S41, the ON duty ratio of the drive power output signal to the electric motor 7 is determined according to the difference amount between the input torque and the target assist torque, and the electric motor 7 is controlled to output the assist torque to finish this control.

At step S42, the output of the electric motor 7 is stopped to finish this control.

Figure 22:
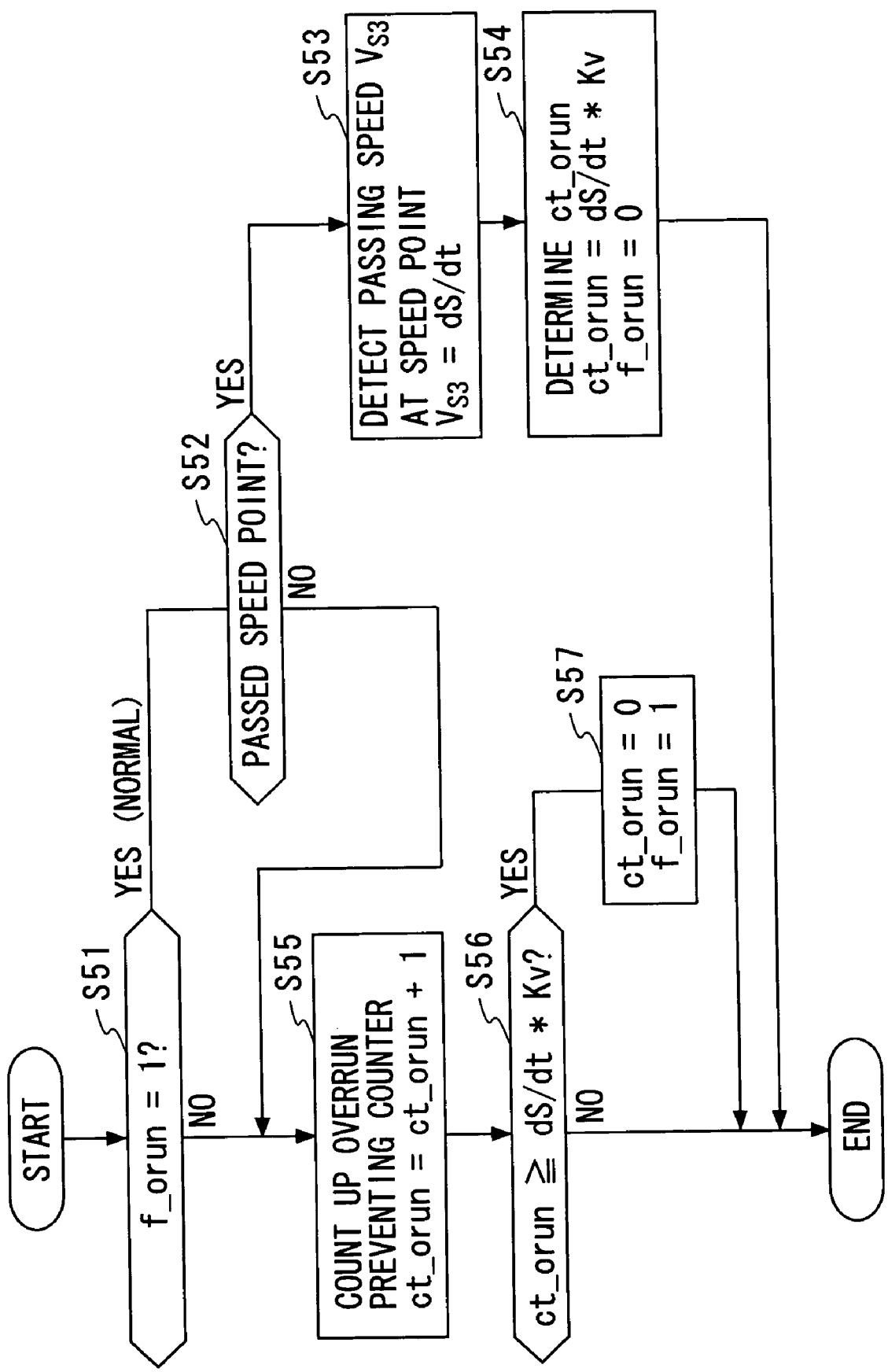
FIG. 22 is a flowchart showing the flow of a target value setting process by an overrun preventing counter executed in the control unit of the select lever device for the automatic transmission according to the third embodiment of the present invention.

The control unit 14 also executes a target value setting process of the counter for preventing the overrun of the select lever 2 according to the flowchart in FIG. 22.

At step S51, the control unit 14 judges whether or not the overrun preventing flag f_orun is 1. If YES, the flow goes to step S52, while, if NOT, the flow goes to step S55.

At step S52, it is judged from a signal of the stroke angle of the select lever 2 whether or not the select lever 2 has passed a speed point. An arbitrary angle can be defined as the speed point. In this embodiment, the position (a stroke angle S3 in FIG. 23) of the select lever 2 when a detent pin 18 reaches a peak of a top portion 16a of a cam formed on a detent plate 16 in a detent mechanism 9 is defined as the speed point.

At step S53, a passing speed $V_{S3}$ at which the select lever 2 passes the speed point S3 is detected. This passing speed $V_{S3}$ can be detected by differentiating dS/dt, namely, a variation in the stroke angle.

At step S54, the passing speed $V_{S3}$ is multiplied by an overrun speed constant Kv to determine a target value dS/dt*Kv of an overrun preventing count number ct_orun. Further, the overrun preventing flag f_orun is set to 0. Step S54 corresponds to a target value setting unit of the present invention.

At step S55, the overrun preventing count number ct_orun is counted up.

At step S56, it is judged whether or not the overrun preventing count number ct_orun is equal to or larger than dS/dt*Kv. If YES, the flow goes to step S57, while, if NOT, this control is finished.

At step S57, the overrun preventing count number ct_orun is set to 0 and the overrun preventing flag f_orun is set to 1 to finish this control.

Step S51 to step S57 correspond to an overrun preventing counter of the present invention.

As is understood from the description above, the control unit 14 executes the control for preventing the overrun of the select lever 2. The operation of the select lever device 1 by this control will be more specifically described. Here, the operation of the overrun preventing control when the select lever 2 is operated in the direction from P position to R position at a higher speed than a normal speed will be described in comparison with the operation without any overrun preventing control for easily understanding the advantages of the select lever device 1 with the overrun preventing control.

First, the description will be given on the operation in which no overrun preventing control process is executed in the select lever device 1 of this embodiment, in other words, the operation in which the process at step 40 is omitted in FIG. 20.

Figure 23:
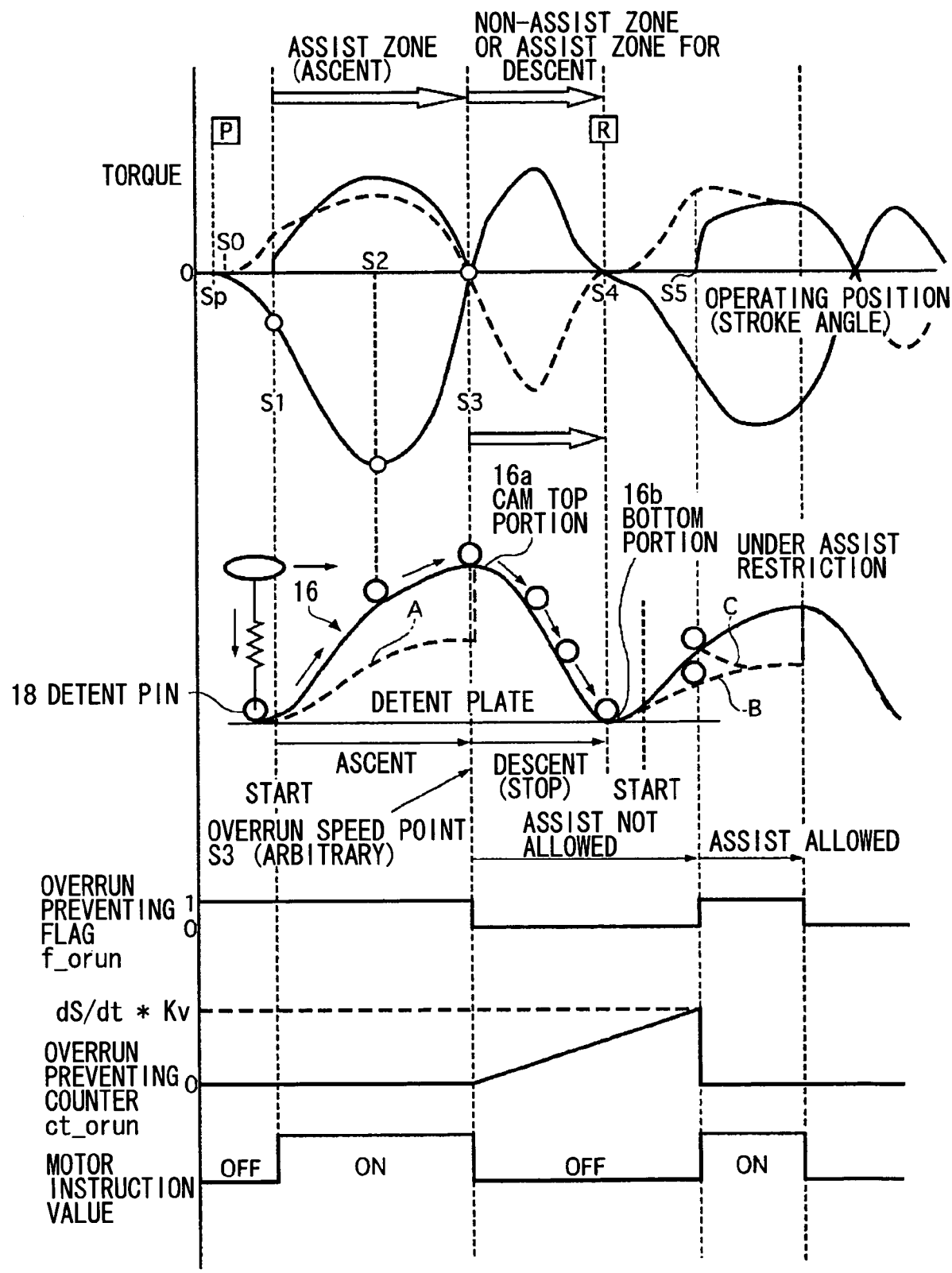
FIG. 23 is a chart illustrating the operation of a select lever overrun prevention control executed in accordance with the flowchart in FIG. 22.

In FIG. 23, in a section from a stroke angle S0 to a stroke angle S1, the flow goes as step S31, step S32, step S33, step S34, step S35 in this order in the flowchart in FIG. 20. Specifically, the input torque is read at step 31, the stroke angle is read at step S32, the operating direction is computed at step S33, the operating speed is computed at step S34, and the select lever 2 is judged not to be in the assist zone at step S35.

In a section from the stroke angle S1 to a stroke angle S3, the flow goes as step S31, step S32, step S33, step S34, step S35, step S36, step S37, step S38 in this order in the flowchart in FIG. 20.

Specifically, the input torque is judged to be equal to or larger than the set torque at step S36, the target assist torque map corresponding to the operating direction and the operating speed is read at step S37, and the target assist torque map according to the stroke angle is set at step S38.

Subsequently, at step S39, the target assist torque and the input torque are compared. If (input torque−target assist torque)>0, the ON duty ratio is determined according to the difference therebetween. The electric motor 7 is driven with this ON duty ratio at step S41, so that the select operation is assisted.

On the other hand, if (input torque−target assist torque)<0, the output of the electric motor 7 is stopped at step S42. At this time, the assist torque of the electric motor 7 causes the apparent characteristic of the cam of the detent plate 16 to be lower than the actual height of the top portion as shown by the broken line A in FIG. 23.

In a section from the stroke angle S3 to a stroke angle S4, it is judged at step S35 in the flowchart in FIG. 20, as in the section from the stroke angle S0 to the stroke angle S1, that the select lever 2 is not in the assist zone, so that the output of the electric motor 7 is stopped. At this time, a pulling force by the mechanical load of a detent mechanism 9 acts on the select lever 2.

In a section from the stroke angle S4 to a stroke angle S5, the electric motor 7 is driven as in the section from the stroke angle S1 to the stroke angle S3, to assist the operating force of the select lever 2 according to the stroke angle and the input torque. At this time, since the apparent characteristic of the cam of the detent plate 16 becomes lower than the actual height of the top portion as shown by the broken line B in FIG. 23, the select lever 2, if operated at a high speed, does not stop at a desired position due to the inertia force to fall into the overrun state.

In the above description, the overrun preventing control is not executed in the select lever device 1. In the description below, the overrun preventing control is executed in the control unit 14.

In FIG. 23, in the section from the stroke angle S0 to the stroke angle S3, the flow goes as step S51, step S52, step S55, step S56, step S57 in this order in the flowchart in FIG. 22.

Specifically, the overran preventing flag f_orun is judged to be 1 at step S51, the select lever 2 is judged not to have passed the speed point at step S52, and the overrun preventing count number ct_orun is counted up at step S55.

Subsequently, the overrun preventing count number ct_orun is judged to be equal to or larger than the target value dS/Dt*Kv at step S56, and the overrun preventing count number ct_orun is set to 0 and the overrun preventing flag f_orun is set to 1 at step S57.

At the stroke angle S3, the flow goes as step S51, step S52, step S53, step S54 in this order in the flowchart in FIG. 22.

Specifically, the select lever 2 is judged to have passed the speed point S3 at step S52, the passing speed $VS_3$ at the speed point S3 is set at step S53, and the target value dS/dt*Kv of the overrun preventing count number ct_orun is determined at step S54.

At this time, since the overrun preventing flag f_orun is set to be 0, the flow goes as step S40, step S42 in this order in the flowchart in FIG. 20, so that the output of the assist torque by the electric motor 7 is stopped.

In the section from the stroke angle S3 to the stroke angle S5, the flow goes as step S51, step S55, step 56 in this order in the flowchart in FIG. 22.

Specifically, the overrun preventing flag f_orun is judged not to be 1 at step S51, the overrun preventing count number ct_orun is counted up at step S55, and the overrun preventing count number ct_orun is judged to be less than dS/dt*Kv at step S56.

Therefore, the output of the assist torque by the electric motor 7 is stopped even in the assist zone when the select lever 2 passes the stroke angle S4. Consequently, the apparent characteristic of the cam of the detent plate 16 has the same height as the actual height of the top portion. Accordingly, a larger mechanical load than that when the select lever 2 is assisted acts on the select lever 2 in the direction opposite to the operating direction to hold back the shift of the select lever 2. This gives an appropriate weight to the select lever 2 to produce a click feeling.

At the stroke angle S4, the flow goes as step S51, step S55, step S56, step S57 in this order in the flowchart in FIG. 22.

Specifically, the overrun preventing count number ct_orun is judged to be equal to or larger than dS/dt*Kv at step S56, and the overrun preventing count number ct_orun is set to 0 and the overrun preventing flag f orun is set to 1 at step S57.

Therefore, the flow goes as step S40, step S41 in this order in the flowchart in FIG. 20, so that the assist control is resumed. Accordingly, the apparent characteristic of the cam of the detent plate 16 becomes lower than the actual height of the top portion as shown by the broken line C in FIG. 23. This facilitates the shift of the select lever 2 in the direction from R position to N position.

Incidentally, in the select lever device 1 of this embodiment, the target assist torque is set based on the operating position of the select lever 2 detected by the position sensor 13 and the mechanical load characteristic, and the ON duty ratio of the drive power output signal to the electric motor 7 is determined according to the difference between the input torque detected by the torque sensor 12 and the target assist torque. However, the ON duty ratio of the drive power output signal to the electric motor 7 can be determined based only on the input torque without using the position sensor 13.

Further, a drive lever 5 and a driven arm 10 of a detent mechanism 9 may be coupled by an arbitrary method. For example, the drive lever 5 and the driven arm 10 may be coupled by a wire cable or the like.

Next, the select lever device 1 according to the third embodiment of the present invention has the following advantages.

The select lever device 1 of this embodiment measures the shaft torque by the mechanical load according to the stroke angle of the select lever 2 in advance, sets the target assist torque based on the mechanical load characteristic, and the target assist torque and the actual input toque are compared, thereby controlling the assist torque. This can bring about a desirable operating characteristic without being influenced by the shaft torque by the mechanical load.

Further, the select lever device 1 of this embodiment sets the target value dS/dt*Kv of the overrun preventing count number ct_orun according to the passing speed $V_{S3}$ at the speed point S3, and stops the output of the assist torque until the overrun preventing count number ct_orun reaches dS/dt*Kv or more. In this manner, the assist amount is reduced when the select lever 2 is shifted at a high speed, which can prevent the overrun since a moderate click feeling is given.

Moreover, in the select lever device 1 of this embodiment, the target value dS/dt*Kv of the overrun preventing count number ct_orun is set in proportion to the operating speed $V_{S3}$ of the shift lever 2 passing the speed point S3. Consequently, at the normal shift speed, the overrun preventing count number ct_orun reaches the target value dS/dt*Kv before the select lever 2 reaches the assist zone of the next select position and the normal assist control is performed, so that no load is given to the driver.

Next, a select lever device according to a fourth embodiment of the present invention will be described.

In a select lever device 1 according to this embodiment, which also has the similar construction as that of the select lever device 1 according to the first embodiment shown in FIG. 1 to FIG. 3, and the correspondence relationship between the stroke angle of a select lever 2 and the output voltage of a position sensor 13 as shown in FIG. 4 is stored in a characteristic data storing unit. The select lever device 1 according to this embodiment further includes an operating speed detecting means to detect the operating speed of the select lever 2.

Next, the operation of the select lever device 1 according to the fourth embodiment of the present invention will be described.

Figure 24:
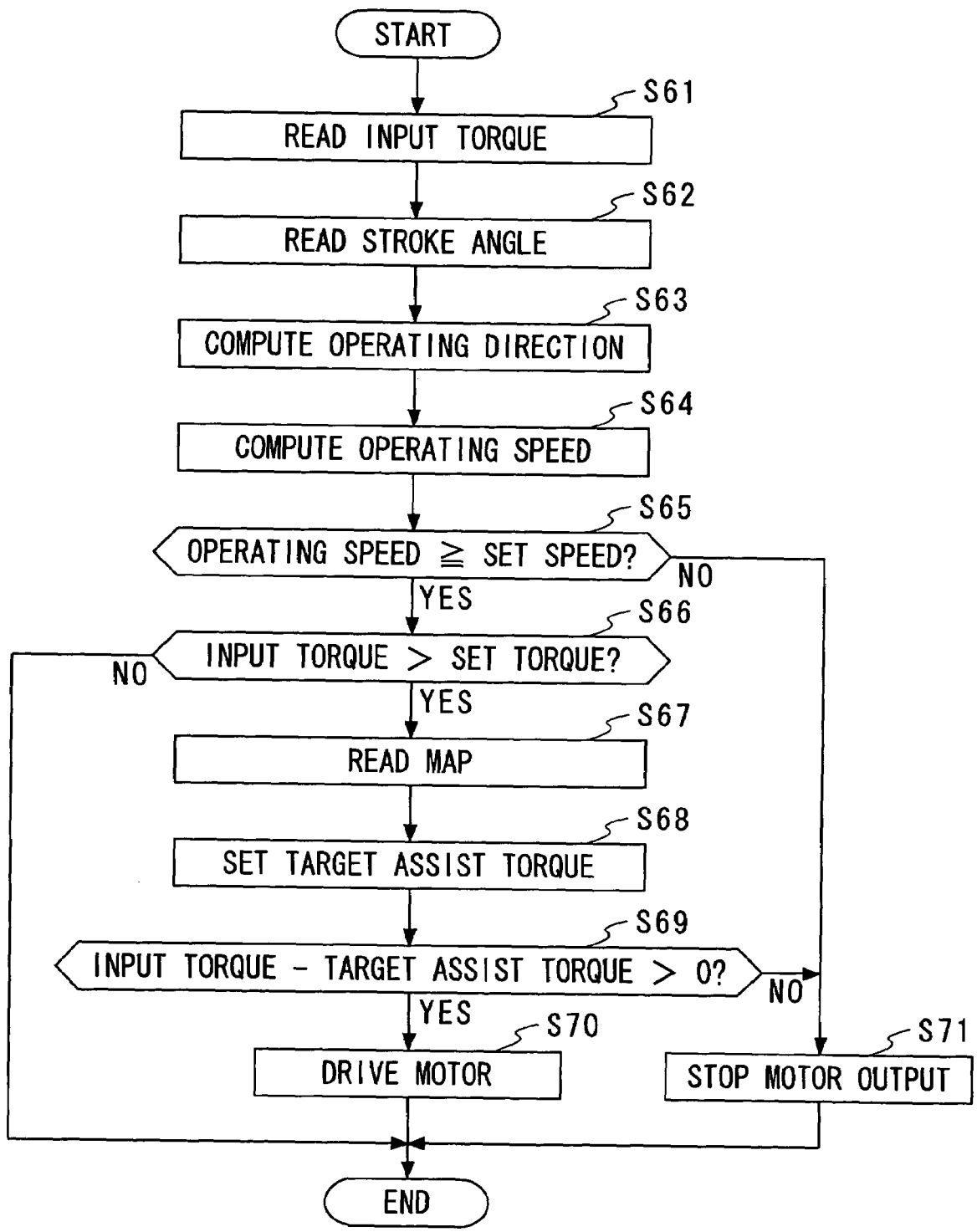
FIG. 24 is a flowchart showing the flow of an assist control process executed in a control unit of a select lever device for an automatic transmission according to a fourth embodiment of the present invention.

A control unit 14 executes an assist control process according to the flowchart in FIG. 24.

At step S61, the control unit 14 reads an input torque of the select lever 2 from an output voltage of a torque sensor 12.

At step S62, the stroke angle of the select lever 2 is read from the output voltage of the position sensor 13.

At step S63, the operating direction of the select lever 2 is computed based on the incremental or decremental difference of the current stroke angle from a last read stroke angle.

At step S64, the operating speed of the select lever 2 is computed from the rate of change of the stroke angle relative to the last read stroke angle.

At step S65, it is judged whether or not the operating speed is equal to or higher than a preset speed. If YES, the flow goes to step S66, while, if NOT, the flow goes to step S71, judging that the select lever 2 is abnormally operated. Note that this set speed corresponds to a second set speed of the present invention.

At step S66, it is judged whether or not the input torque is larger than a preset torque. If YES, the flow goes to step S67, while, if NOT, this control is finished. Specifically, as shown in FIG. 21, when the input torque exceeds a value range in a dead zone (a torque range in which no assist is given), the output of the assist torque is started, as in the select lever device 1 according to the third embodiment.

At step S67, a target assist torque map corresponding to the operating direction and the operating speed of the select lever 2 is read.

At step S68, a target assist torque is set based on the read target assist torque map and the detected stroke angle.

At step S69, it is judged whether or not the subtraction of the target assist torque from the input torque gives a value larger than zero. If YES, the flow goes to step S70, while, if NOT, the flow goes to step S71.

At step S70, an ON duty ratio of a drive power output signal to an electric motor 7 is determined according to the difference between the input torque and the target assist torque, and the electric motor 7 is controlled to output the assist torque to finish this control.

At step S71, the output of the electric motor 7 is stopped to finish this control.

Here, the advantages of the select lever device 1 according to this embodiment will be described.

First, for better understanding of the advantages of the select lever device 1 according to this embodiment, a problem caused by a low operating speed of the select lever 2 in a select lever device without the above described control will be described.

Figure 25:
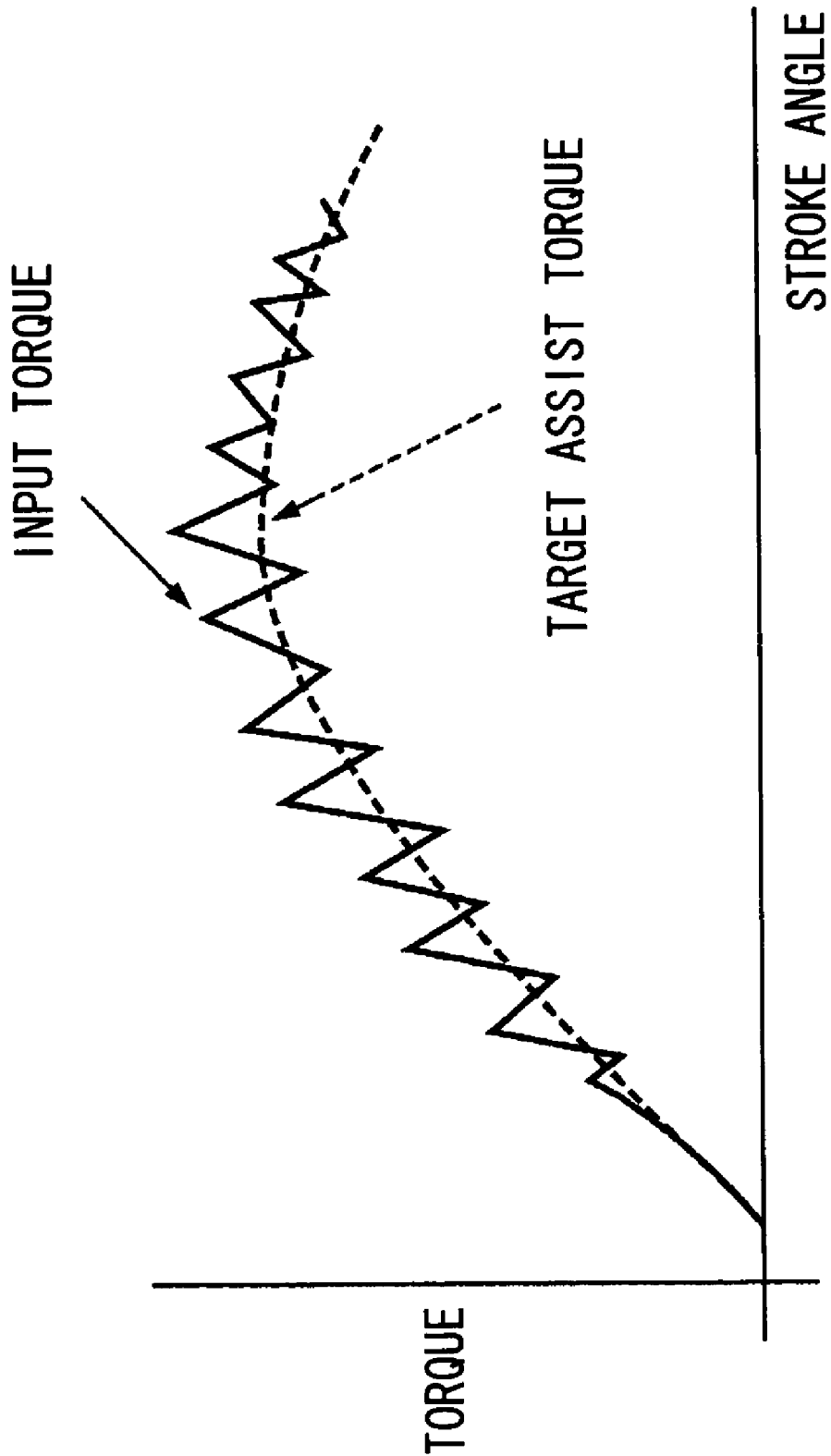
FIG. 25 is a chart illustrating the state of a problem occurring when the operating speed of a select lever is low.

FIG. 25 is a chart showing an input torque characteristic when the select lever 2 is operated at a low speed. The flow of the operation at this time will be described below.

When the input torque exceeds the target assist torque, the assist torque is outputted according to an exceeding amount of the input torque relative to the target assist torque, so that the input torque comes to approximate the target assist torque.

In this case, due to the low operating speed of the select lever 2, a value of the input torque becomes equal to or smaller than the target assist torque in accordance with a slight change in the stroke angle. Therefore, the output of the assist torque is stopped. However, due to the low operating speed of the select lever 2, the input torque becomes larger than the target assist torque in accordance with a slight change in the stroke angle.

Therefore, when the operating speed of the select lever 2 is low, the frequent change in the input value such as getting larger and smaller than the target assist torque is repeated. Therefore, ON/OFF of the electric motor 7 is frequently repeated in a short time and the amplitude of jerk is increased. This results in the vibration of the select lever 2, and the vibration is transmitted to the driver's hand to give a bad operating feeling.

Figure 26:
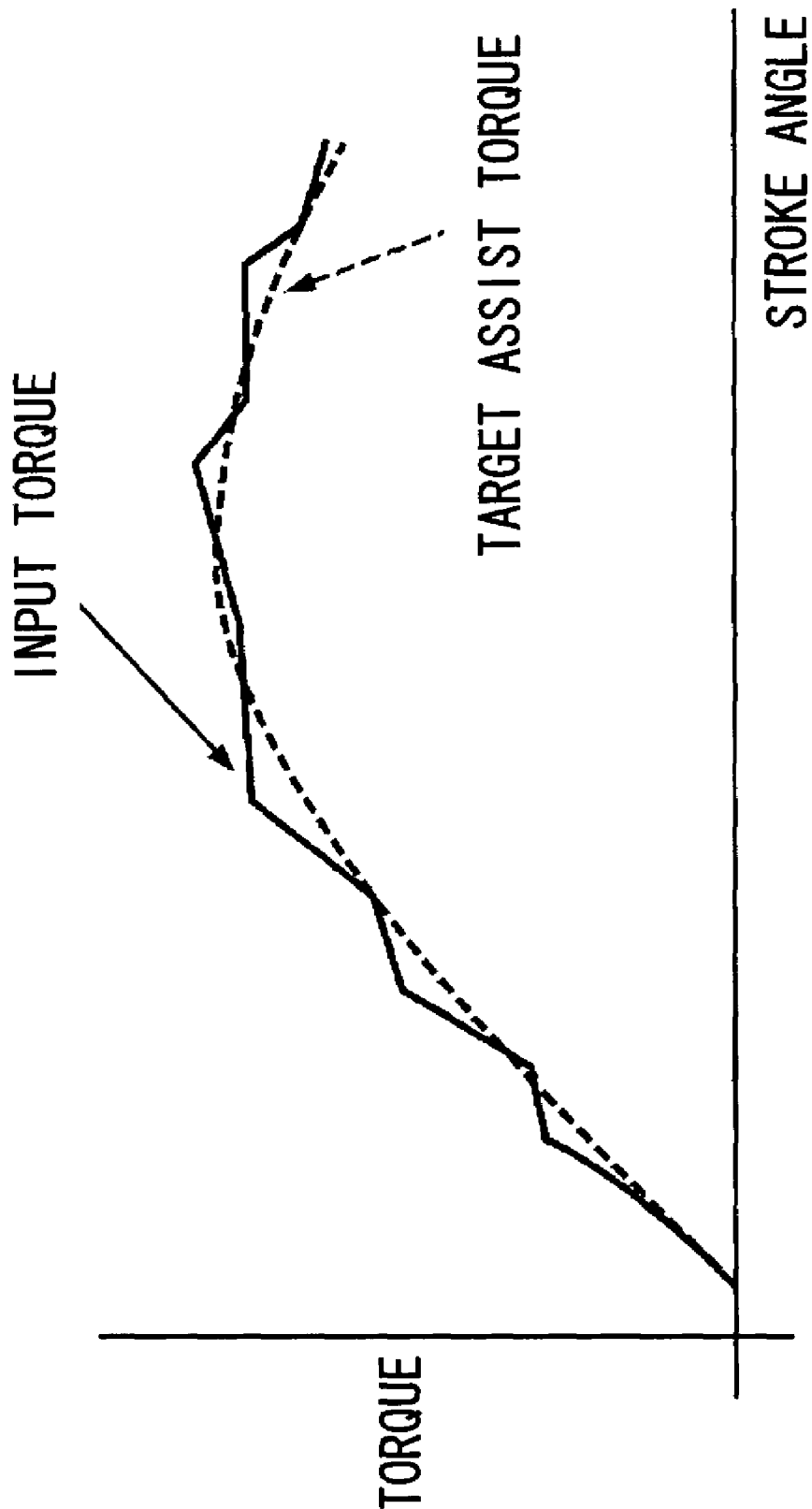
FIG. 26 is a chart showing the correlation between the operation of the select lever and an input torque characteristic after the problem occurring in FIG. 25 is solved by the select lever device for the automatic transmission according to the fourth embodiment of the present invention.

In contrast, as shown in FIG. 26, when the select lever 2 is operated at a normal speed or a high speed, the frequent repetition of ON/OFF of the electric motor 7 is not caused, and the amplitude of jerk is negligibly small. Therefore, the above-described problem does not occur.

On the other hand, in the select lever device 1 of this embodiment, the assist stop control when the select lever operating speed is low is as follows.

First, the control when the select lever 2 is operated at a normal speed will be described.

In this case, the flow goes as step S61, step S62, step S63, step S64, step S65, step S66, step S67, step S68, step S69 in this order in the flowchart in FIG. 24.

Subsequently, if the target assist torque is judged to be smaller than the input torque at step S69, the electric motor 7 is driven such that the input torque becomes equal to the target assist torque at step S70. On the other hand, when the target assist torque is equal to or larger than the input torque, the output of the assist torque is stopped at step S71.

In comparison, the control when the select lever 2 is operated at a low speed will be described.

In this case, the flow goes as step S61, step S62, step S63, step S64, step S65, step S71 in this order in the flowchart in FIG. 24. Specifically, the select lever 2 is judged to be abnormally operated at step S65 and the output of the electric motor 7 is stopped at step S71. At this time, due to the stop of the output of the assist torque, the select lever 2 feels heavier, but since the select lever 2 does not vibrate, a bad operating feeling is not given.

Incidentally, in the select lever device 1 according to the fourth embodiment, the target assist torque is set based on the operating position of the select lever 2 detected by the position sensor 13 and the mechanical load characteristic, and the ON duty ratio of the drive power output signal to the electric motor 7 is determined according to the difference between the input torque detected by the torque sensor 12 and the target assist torque. However, the ON duty ratio of the drive power output signal to the electric motor 7 may be determined based only on the input torque, without using the position sensor 13.

Further, a drive lever 5 and a driven arm 10 of a detent mechanism 9 may be coupled by an arbitrary method. For example, the drive lever 5 and the driven arm 10 may be coupled by a wire cable or the like.

Next, the select lever device 1 of this embodiment has the following advantages.

The select lever device 1 of this embodiment sets the target assist torque with which an ideal operating characteristic is obtainable, in consideration of the mechanical load of an automatic transmission 8 for each stroke angle of the select lever 2, and controls the assist torque such that the target assist torque equals the actual input torque. Therefore, a desirable operating characteristic is obtained without being influenced by a shaft torque by the mechanical load of the automatic transmission 8.

In the select lever device 1 of this embodiment, the select lever 2 is judged to be abnormally operated and stops the output of the electric motor 7 when the operating speed of the select lever 2 is lower than the preset speed. Consequently, the select lever 2 does not vibrate even when the driver operates the select lever 2 at an extremely low speed. This can prevent a bad operating feeling.

In the select lever device 1 of this embodiment, the operating speed of the select lever 2 is detected based on the variation in the stroke angle detected by the position sensor 13. This can reduce manufacturing cost due to a smaller number of parts compared with the case when a means for detecting the operating speed is separately provided.

The entire contents of Japanese Patent Application 2003-001509 (filed Jan. 7, 2003), Japanese Patent Application 2003-054168 (filed Feb. 28, 2003), Japanese Patent Application 2003-074198 (filed Mar. 18, 2003), Japanese Patent Application 2003-074200 (filed Mar. 18, 2003) are incorporated herein by reference.

What is claimed is:

1. A select lever device for an automatic transmission comprising:
   a select lever;
   a select position detector of a select position mode of the automatic transmission shifted by said select lever;
   an input torque detecting unit to detect an input torque to said select lever and output an input torque signal;
   an operating position detecting unit to detect an operating position of said select lever and output a signal of the operating position of said select lever;
   a characteristic data storing unit in which characteristic data obtained based on a mechanical load characteristic of said select lever is stored;
   an assist control unit to output an assist control signal that controls assist torque based on the input torque signal inputted from said input torque detecting unit, the operating position inputted from said operating position detecting unit, and the characteristic data read from said characteristic data storing unit; and
   an assist actuator to output to said select lever the assist torque for assisting the operating force inputted to said select lever, based on the assist control signal inputted from said assist control unit.

2. A select lever device for an automatic transmission according to claim 1,
wherein said assist control unit comprises:
a target assist torque setting means to set a target assist torque based on the signal of the operating position of said select lever and the mechanical load characteristic data of said select lever; and
a target assist torque correcting means to correct the set target assist torque according to the input torque detected by said input torque detecting unit, and
wherein said assist control unit outputs the assist control signal with the corrected target assist torque as a target value.

3. A select lever device for an automatic transmission according to claim 2,
wherein said target assist torque setting means sets the target assist torque to one of zero torque and torque in a direction opposite to an operating direction of said select lever when a mechanical load acting on said select lever is minus.

4. A select lever device for an automatic transmission according to claim 2, further comprising
a detent mechanism including: a detent plate in which a cam having top portions and bottom portions corresponding to a plurality of select positions of said automatic transmission respectively is formed; and a detent pin movable along the cam and lockable in the bottom portion,
wherein said target assist torque setting means sets the target assist torque to one of zero torque and torque in a direction opposite to an operating direction of said select lever when the detent pin has got over a peak of the top portion of the cam of the detent plate.

5. A select lever device for an automatic transmission according to claim 2,
wherein said characteristic data storing unit stores a target assist torque map in which the target assist torque according to the operating position of said select lever is set in advance, and
wherein said target assist torque setting means sets the target assist torque based on the operating position of said select lever and the target assist torque map.

6. A select lever device for an automatic transmission according to claim 5, further comprising
an operating speed detecting means to detect an operating speed of said select lever,
wherein said characteristic data storing unit stores a plurality of the target assist torque maps corresponding to the operating speeds of said select lever, and
wherein said target assist torque setting means switches the target assist torque maps according to the operating speed of said select lever detected by said operating speed detecting means.

7. A select lever device for an automatic transmission according to claim 1, further comprising:
a set value storing unit in which operating position set data on the operating position of said select lever and a set value of the output signal that is set for each operating position is stored;
a halt judging means to judge whether said select lever is in halt;
a difference detecting means to compare, when said halt judging means judges that said select lever is in halt, an actual input value of the signal of the operating position of said select lever in a current select position, which is outputted from said operating position detecting unit, and the set value read from said set value storing unit, based on the current select position detected by said select position detector, and to detect a difference amount between the set value and the input value; and
an operating position set data correcting means to correct the operating position set data stored in said set value storing unit, based on the input value when the detected difference amount is larger than a first threshold value.

8. A select lever device for an automatic transmission according to claim 7,
wherein said halt judging means judges that said select lever is in halt when the input torque is substantially zero.

9. A select lever device for an automatic transmission according to claim 8,
wherein said halt judging means judges that said select lever is in halt when a substantially zero state of the input torque continues for a preset period of time.

10. A select lever device for an automatic transmission according to claim 7,
wherein said halt judging means judges that said select lever is in halt when the input torque is zero and a difference between a current obtained value and a last obtained value of said operating position detecting unit is within a predetermined range.

11. A select lever device for an automatic transmission according to claim 7, further comprising:
a failure judging means to judge that said operating position detecting unit has a failure when the detected difference amount is at least a second threshold value that is set larger than the first threshold value; and
an assist restricting means to control said assist actuator to stop outputting the assist torque when said failure judging means judges that said operating position detecting unit has the failure, and
wherein said operating position set data correcting means corrects the operating position set data when the detected difference amount is larger than the first threshold value and smaller than the second threshold value.

12. A select lever device for an automatic transmission according to claim 1, further comprising
an operating speed detecting means to detect an operating speed of said select lever,
wherein, when the operating speed of said select lever detected by said operating speed detecting means exceeds a preset speed, said assist control unit outputs one of the following signals: an assist control signal that controls the assist torque in the selected select position to be smaller than the assist torque that is set when the operating speed of said select lever is at most the set speed; and an assist control signal that controls the output of the assist torque to be delayed until a preset period of time passes.

13. A select lever device for an automatic transmission according to claim 12, further comprising
a counter that starts counting when said select lever reaches a speed point set for each select position,
wherein said assist control unit controls said assist actuator to stop outputting the assist torque until a target value is reached after said counter starts counting.

14. A select lever device for an automatic transmission according to claim 13,
wherein said assist control unit comprises a target value setting unit to set the target value of said counter according to the operating speed of said select lever passing the speed point.

15. A select lever device for an automatic transmission according to claim 13,
wherein the speed point is set to a switching position where said select lever shifts between a section in which a mechanical load of said automatic transmission acts in a direction opposite to an operating direction of said select lever and a section in which the mechanical load of said automatic transmission acts in a same direction as the operating direction of said select lever.

16. A select lever device for an automatic transmission according to claim 1, further comprising
an operating speed detecting means to detect an operating speed of said select lever,
wherein said assist control unit judges that said select lever is abnormally operated when the operating speed of said select lever is lower than a preset speed, and controls said assist actuator to stop outputting the assist torque.

17. A select lever device for an automatic transmission according to claim 16,
wherein said assist control unit sets a target torque according to the operating position of said select lever, compares the set target torque and the input torque, and controls said assist actuator to output the assist torque according to a difference between the target torque and the input torque when the target torque is at most the input torque and to stop outputting the assist torque when the target torque is larger than the input torque.

18. A select lever device for an automatic transmission according to claim 7, further comprising
an operating speed detecting means to detect an operating speed of said select lever,
wherein, when the operating speed of said select lever detected by said operating speed detecting means exceeds a preset speed, said assist control unit outputs one of the signals of an assist control signal that controls the assist torque in a selected select position to be smaller than the assist torque that is set when the operating speed of said select lever is at most the set speed; and an assist control signal that controls the output of the assist torque to be delayed until a preset period of time passes.

19. A select lever device for an automatic transmission according to claim 7, further comprising
an operating speed detecting means to detect an operating speed of said select lever,
wherein said assist control unit judges that said select lever is abnormally operated when the operating speed of said select lever is lower than a preset speed, and controls said assist actuator to stop outputting the assist torque.

20. A select lever device for an automatic transmission according to claim 12,
wherein said assist control unit judges that said select lever is abnormally operated when the operating speed of said select lever is lower than a second set speed that is smaller than the set speed, and controls said assist actuator to stop outputting the assist torque.

* * * * *